(12) United States Patent
Kong et al.

(10) Patent No.: US 10,714,945 B2
(45) Date of Patent: Jul. 14, 2020

(54) CHARGE CONTROL CIRCUIT USING BATTERY VOLTAGE TRACKING, AND A DEVICE HAVING THE SAME

(71) Applicant: SAMSUNG ELECTRONICS CO., LTD., Suwon-si, Gyeonggi-do (KR)

(72) Inventors: Tae Hwang Kong, Hwaseong-si (KR); Sun Kyu Lee, Hwaseong-si (KR); Sung Yong Lee, Suwon-si (KR); Dae Yong Kim, Seoul (KR); Sang Ho Kim, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/168,017

(22) Filed: Oct. 23, 2018

(65) Prior Publication Data

US 2019/0058344 A1 Feb. 21, 2019

Related U.S. Application Data

(63) Continuation of application No. 15/096,687, filed on Apr. 12, 2016, now Pat. No. 10,110,032.

(30) Foreign Application Priority Data

Aug. 7, 2015 (KR) .......................... 10-2015-0111357

(51) Int. Cl.
*H02J 7/00* (2006.01)
*H02J 7/02* (2016.01)
(Continued)

(52) U.S. Cl.
CPC ................ *H02J 7/00* (2013.01); *H02J 7/025* (2013.01); *H02J 7/342* (2020.01); *H02J 50/12* (2016.02);
(Continued)

(58) Field of Classification Search
USPC ......................................................... 320/164
See application file for complete search history.

(56) References Cited

U.S. PATENT DOCUMENTS 7,570,039 B1  8/2009  Vu
7,791,311 B2  9/2010  Sagoo
(Continued)

FOREIGN PATENT DOCUMENTS

CN    102457086    5/2012
JP    2007143382   6/2007
(Continued)

OTHER PUBLICATIONS

Taiwanese Office Action issued in corresponding Taiwanese application No. 105118475 dated Nov. 1, 2019.

*Primary Examiner* — Mohammed Alam
(74) *Attorney, Agent, or Firm* — F. Chau & Associates, LLC

(57) ABSTRACT

A charge control circuit includes: a charge current control circuit configured to receive an input voltage at a first node, output a sensing current to a second node, and turn on a power transistor; a comparator configured to compare a voltage level of the second node with a voltage level of a third node, wherein the third node receives a charging current from the power transistor; a current mirror configured to generate a mirror current corresponding to the sensing current; and an amplifier configured to receive a first feedback voltage based on the mirror current, and amplify a difference between the first feedback voltage and a reference voltage to generate a switch control signal, wherein in response to the switch control signal and a plurality of control signals, the charge current control circuit is configured to decrease the sensing current and turn on the power transistor.

20 Claims, 16 Drawing Sheets

(51) Int. Cl.
*H04B 5/00* (2006.01)
*H02J 50/40* (2016.01)
*H02J 50/12* (2016.01)
*H02J 7/34* (2006.01)

(52) U.S. Cl.
CPC ............ *H02J 50/40* (2016.02); *H04B 5/0037* (2013.01); *H02J 2207/20* (2020.01)

(56) References Cited

U.S. PATENT DOCUMENTS

| | | | |
|---|---|---|---|
| 8,212,518 B2 | 7/2012 | Pijnenburg et al. | |
| 2005/0134220 A1* | 6/2005 | Brohlin | H02J 7/0052 320/128 |
| 2006/0232241 A1 | 10/2006 | Lu et al. | |
| 2007/0210756 A1* | 9/2007 | Choi | H02J 7/0077 320/128 |
| 2007/0263420 A1* | 11/2007 | Nate | H02J 7/06 363/125 |
| 2009/0021219 A1* | 1/2009 | Yoda | H02J 50/12 320/137 |
| 2010/0231172 A1 | 9/2010 | Bastami et al. | |
| 2011/0074352 A1* | 3/2011 | Huynh | H02M 3/33523 320/111 |
| 2013/0157565 A1 | 6/2013 | Clement et al. | |
| 2013/0162200 A1 | 6/2013 | Terry et al. | |
| 2013/0188397 A1* | 7/2013 | Wu | H01F 38/14 363/17 |
| 2013/0234658 A1 | 9/2013 | Endo et al. | |
| 2014/0055078 A1 | 2/2014 | Jing | |
| 2014/0361733 A1 | 12/2014 | Zhu et al. | |
| 2015/0087228 A1 | 3/2015 | Porat et al. | |
| 2017/0040818 A1* | 2/2017 | Kong | H02J 7/0052 |

FOREIGN PATENT DOCUMENTS

| | | |
|---|---|---|
| JP | 2009071964 | 4/2009 |
| KR | 101192665 | 10/2012 |
| KR | 1020150025369 | 3/2015 |
| TW | 200812191 | 3/2008 |
| TW | 201434236 | 9/2014 |

* cited by examiner

CHARGE CONTROL CIRCUIT USING BATTERY VOLTAGE TRACKING, AND A DEVICE HAVING THE SAME

CROSS-REFERENCE TO RELATED APPLICATIONS

This application is a continuation of U.S. application Ser. No. 15/096,687, filed on Apr. 12, 2016, which claims priority under 35 U.S.C. § 119 to Korean Patent Application No. 10-2015-0111357, filed on Aug. 7, 2015, in the Korean Intellectual Property Office, the disclosures of which are incorporated by reference herein in their entireties.

TECHNICAL FIELD

Exemplary embodiments of the present inventive concept relate to a semiconductor device, and more particularly, to a charge control circuit, and a device having the same.

DISCUSSION OF RELATED ART

Wearable devices such as a smart watch are increasingly being developed. Wearable devices are generally smaller than a smart phone. Wearable devices generally use a battery having a small capacity. Accordingly, a battery of a wearable device is frequently charged. In general, the battery of the wearable device is charged using an additional charging device.

A charging device generally includes a charging circuit which charges a battery, and a step-down switching direct current (DC)-DC converter which adjusts a power supplied to the charging circuit to increase a charging efficiency of the battery. The charging efficiency of the battery is determined by a ratio of an input voltage to an output voltage of the charging circuit. As a difference between the input voltage and the output voltage of the charging circuit is increased, the charging efficiency of the battery is lowered. Accordingly, to reduce the difference between the input voltage and the output voltage, the step-down switching DC-DC converter is used in the charging device. However, since the step-down switching DC-DC converter includes a capacitor and an inductor, the step-down switching DC-DC converter has a large size and accordingly the charging device is increased in size. Therefore, such a step-down switching DC-DC converter may increase the size of a wearable device.

SUMMARY

In accordance with an exemplary embodiment of the present inventive concept, a charge control circuit comprises: a charge current control circuit configured to receive an input voltage at a first node, output a sensing current to a second node, and turn on a power transistor; a comparator configured to compare a voltage level of the second node with a voltage level of a third node, wherein the third node receives a charging current from the power transistor; a current mirror configured to generate a mirror current corresponding to the sensing current; and an amplifier configured to receive a first feedback voltage based on the mirror current, and amplify a difference between the first feedback voltage and a reference voltage to generate a switch control signal, wherein in response to the switch control signal and a plurality of control signals, the charge current control circuit is configured to decrease the sensing current and turn on the power transistor.

The charge current control circuit may include a plurality of transistors and a plurality of switches.

A number of the transistors to be turned on may be determined by the plurality of control signals.

Values of the plurality of control signals may be determined by the voltage level at the third node.

When the sensing current is decreased a voltage of the switch control signal may be decreased.

When the voltage of the switch control signal is decreased the power transistor may be fully turned on.

The plurality of control signals may be provided to the charge control circuit from a control circuit.

An output of the comparator may be provided to the current mirror via a plurality of transistors.

The amplifier may include a multiplexer, a first input terminal to receive the reference voltage, a second input terminal to receive the first feedback voltage, a third input terminal to receive a second feedback voltage, and a comparator.

When the first feedback voltage is greater than the second feedback voltage, the first feedback voltage maybe passed through the multiplexer to an input terminal of the comparator for comparison with the reference voltage.

The first feedback voltage may be passed through the multiplexer in a constant current mode.

The charge control circuit may further comprise: a control signal generator connected to an output terminal of the power transistor and configured to generate control signals according to a voltage at the output terminal of the power transistor.

The input voltage may have a first current level, the sensing current may have a second current level greater than the first current level, and the power transistor may be partially turned on by the first current level of the input voltage.

The power transistor may be fully turned on by decreasing the sensing current, wherein the sensing current is decreased by decreasing a number of transistors that are turned on in the charge current control circuit.

In accordance with an exemplary embodiment of the present inventive concept, a charge control circuit configured to supply a charging voltage to a battery is provided. The charge control circuit comprising: an input terminal configured to receive an input voltage from a rectifier circuit; and an output terminal connected to the battery, wherein the charge control circuit is configured to control the input voltage so that the input voltage tracks the charging voltage.

The charge control circuit further comprises: a power transistor connected to the output terminal to provide the charging voltage to the battery; a comparator having a first input terminal connected to the power transistor and a second input terminal connected to a node of the charge current control circuit, wherein a sensing current of the charge current control circuit is input to the first input terminal of the comparator via the node; a current mirror connected to an output terminal of the comparator and configured to generate a mirror current corresponding to the sensing current; and an amplifier configured to receive a reference voltage, a first feedback voltage, and a second feedback voltage and, based on a difference between the reference voltage and the first feedback voltage or a difference between the reference voltage and the second feedback voltage, the amplifier outputs a switch control signal.

The charge current control circuit may include a plurality of transistors that are turned on in response to the switch control signal.

The charge current control circuit may include a plurality of switches that are turned on in response to control signals provided from a control signal generator.

The charge control circuit may further include at least one transistor connected between the output terminal of the comparator and the current mirror.

An input terminal of the at least one transistor may be connected to the node of the charge current control circuit and a control terminal of the at least one transistor is connected to the output terminal of the comparator.

The second feedback voltage may be generated by a voltage divider connected to the output terminal of the power transistor.

The amplifier may include a multiplexer configured to supply the first feedback voltage to a comparison circuit when the first feedback voltage is greater than the second feedback voltage.

The charge control circuit may further comprise: a control signal generator connected to the power transistor and configured to generate control signals according to the charging voltage provided from the power transistor.

In accordance with an exemplary embodiment of the present inventive concept, a device comprises: a rectifier circuit configured to rectify an alternating current (AC) signal received by the device into a direct current (DC) signal and output the DC signal as an input voltage; a charge control circuit configured to output a charging voltage based on the input voltage, wherein the charge control circuit is directly connected to the rectifier circuit to receive the input voltage, and wherein the input voltage is controlled by the charge control circuit to track the charging voltage during a charging period; and a control circuit configured to control the rectifier circuit, the charge control circuit including: a charge current control circuit configured to receive the input voltage, output a sensing current, and turn on a power transistor; and an amplifier configured to receive a first feedback voltage, and amplify a difference between the first feedback voltage and a reference voltage to generate a switch control signal.

The device may further comprise: a matching circuit configured to wirelessly receive power from a smartphone.

The device may be a wearable device.

The device may be charged while wirelessly communicating with the smartphone.

BRIEF DESCRIPTION OF THE DRAWINGS

The above and other features of the present inventive concept will become more apparent by describing in detail exemplary embodiments thereof with reference to the accompanying drawings of which.

DETAILED DESCRIPTION OF THE EMBODIMENTS

Figure 1:
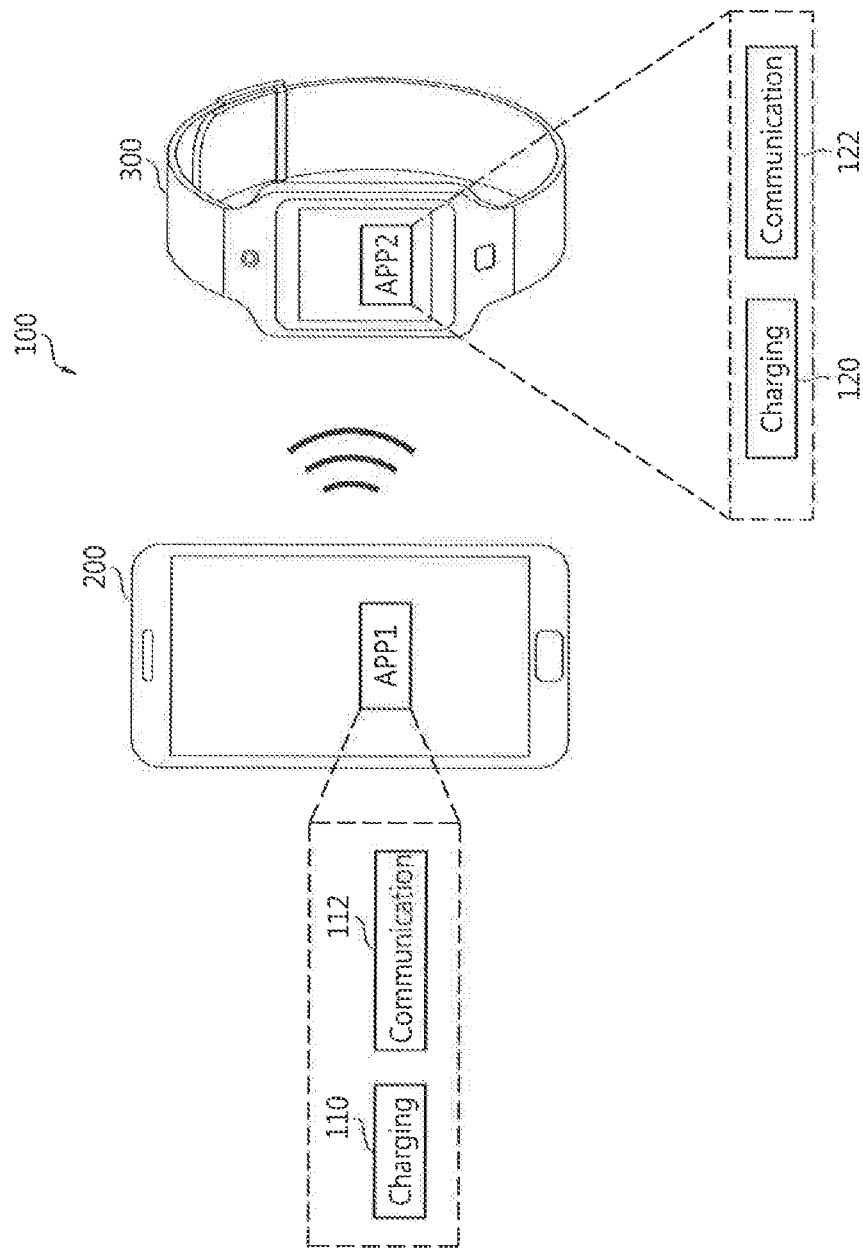
FIG. 1 shows a block diagram of a wireless charging system which includes a second mobile device that can be charged using a wireless signal output from a first mobile device, according to an exemplary embodiment of the present inventive concept.

FIG. 1 shows a block diagram of a wireless charging system which includes a second mobile device that can be charged using a wireless signal output from a first mobile device, according to an exemplary embodiment of the present inventive concept. Referring to FIG. 1, a wireless charging system 100 may include a first mobile device 200 and a second mobile device 300. For example, the first mobile device 200 may be a wireless power transmitting device, and the second mobile device 300 may be a wireless power receiving device.

The first mobile device 200 may wirelessly transmit an electric power to the second mobile device 300 using a wireless power transfer (WPT) or a wireless energy transmission. Wireless power technologies may include inductive coupling, resonant inductive coupling, and capacitive coupling. Each of the mobile devices 200 and 300 may include an antenna for the WPT or the wireless energy transmission.

For example, the first mobile device 200 may transmit a wireless power to the second mobile device 300 using a wireless local area network (WLAN) such as wireless fidelity (Wi-Fi), a wireless personal area network (WPAN) such as Bluetooth, a wireless universal serial bus (USB), Zigbee, near field communication (NFC), or radio-frequency identification (RFID). For example, the first mobile device 200 may supply a wireless power to the second mobile device 300 in a non-contact manner. In other words, power may be supplied from the first mobile device 200 to the second mobile device 300 without making a physical connection between the mobile devices 200 and 300.

A mobile device according to an exemplary embodiment of the present inventive concept may be a small computing device such as a handheld computer having a display screen including a touch input device and a reduced keyboard. For example, the mobile device may include an operating system (OS) and a processor which can execute the OS, and the OS and/or the processor may execute various types of application software referred to as "apps." The mobile device may include an antenna, a communication circuit, or a communication module which is used for a connection to the internet or other mobile devices. The mobile device may include a camera or a multimedia player, and may include a rechargeable battery such as a lithium battery. Moreover, the mobile device may include sensors (for example, accelerometers, compasses, magnetometers, and/or gyroscopes) for detection of a direction and/or detection of a motion.

For example, the mobile device may be a laptop computer, a mobile phone, a smart phone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an interact of things (IoT) device, an internet of everything (IoE) device, a drone, or an e-book.

The first mobile device 200 may include a first application APP1 for controlling wireless charging and wireless communication of the second mobile device 300. The first application APP1 may display a first graphic user interface (GUI) 110 for controlling the wireless charging and a second GUI 112 for controlling the wireless communication through a display (or a display device).

For example, when a user of the first mobile device 200 selects (or touches) the first GUI 110, the first mobile device 200 may generate a wireless communication signal (or wireless charging signal) for performing wireless charging on the second mobile device 300, and transmit a generated wireless communication signal to the second mobile device 300. When the user of the first mobile device 200 selects (or touches) the second GUI 112, the first mobile device 200 may transmit or receive a wireless communication signal for wireless communication with the second mobile device 300 to or from the second mobile device 300.

The second mobile device 300 may simultaneously perform a wireless charging operation while performing the wireless communication with the first mobile device 200. The second mobile device 300 may include a second application APP2 for controlling wireless charging from the first mobile device 200 and wireless communication with the first mobile device 200. The second application APP2 may display a third GUI 120 for controlling the wireless charging and a fourth GUI 122 for controlling the wireless communication on a display (or a display device).

For example, when a user of the second mobile device 300 selects or touches the third GUI 120, the second mobile device 300 may charge a battery of the second mobile device 300 using a wireless communication signal transmitted from the first mobile device 200. When the user of the second mobile device 300 selects or touches the fourth GUI 122, the second mobile device 300 may transmit or receive a wireless communication signal for wireless communication with the first mobile device 200 to or from the first mobile device 200.

According to an exemplary embodiment of the present inventive concept, at least one of the applications APP1 and APP2 may be installed in at least one of the mobile devices 200 and 300. In addition, a user of each of the mobile devices 200 and 300 may download each of the applications APP1 and APP2 from an app store for an installation; however, the present inventive concept is not limited thereto.

FIG. 1 shows a smart phone as an example of the first mobile device 200 and a smart watch as an example of the second mobile device 300. However, present inventive concept is not limited thereto and the mobile devices 200 and 300 may be variously changed.

Figure 2:
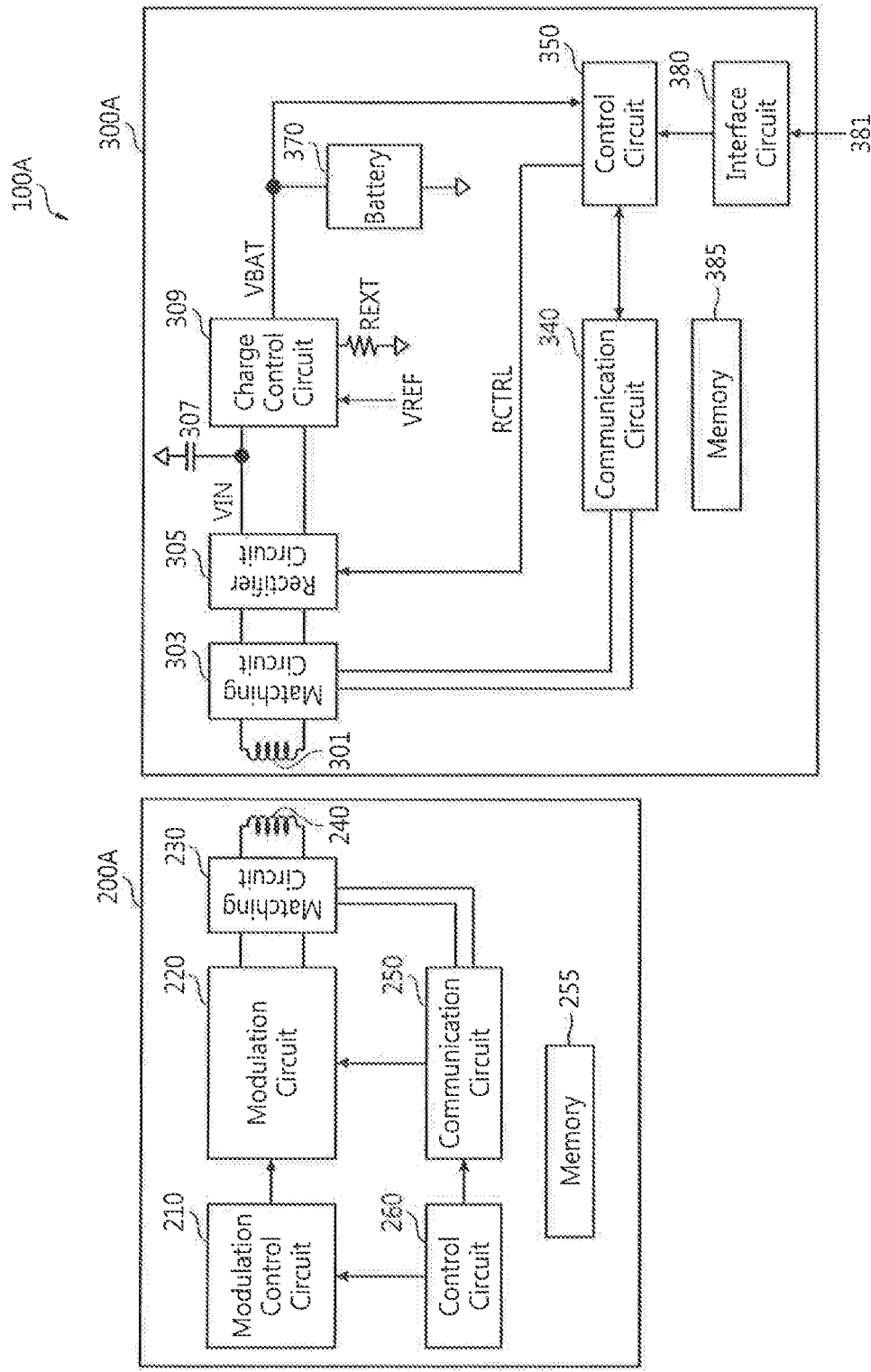
FIG. 2 shows a block diagram of the first mobile device and a block diagram of the second mobile device shown in FIG. 1, according to an exemplary embodiment of the present inventive concept.

FIG. 2 shows a block diagram of the first mobile device and a block diagram of the second mobile device shown in FIG. 1, according to an exemplary embodiment of the present inventive concept.

Referring to FIGS. 1 and 2, a wireless charging system 100A may include a first mobile device 200A and a second mobile device 300A. In FIG. 2, it is assumed that only the second application APP2 is installed in the second mobile device 300A. Accordingly, whether or not to perform wireless charging on the second mobile device 300A may be determined by a user of the second mobile device 300A.

The first mobile device 200A may include a modulation control circuit 210, a modulation circuit 220, a matching circuit 230, an antenna 240, a communication circuit 250, a memory 255, and a control circuit 260.

The modulation control circuit 210 may control a modulation operation of the modulation circuit 220 according to a control of the control circuit 260. The modulation circuit 220 may modulate a carrier wave based on data to be transmitted to the second mobile device 300A according to a control of the modulation control circuit 210.

The matching circuit 230 may be connected to the antenna 240 in parallel to form a resonance circuit. For example, the matching circuit 230 may include a capacitor. The antenna 240 may transmit a modulation signal output from the modulation circuit 220 to the second mobile device 300A. For example, the antenna 240 may be a coil antenna; however, it is not limited thereto.

A wireless signal received from the second mobile device 300A may be transmitted to the communication circuit 250 through the antenna 240 and the matching circuit 230. The communication circuit 250 may perform wireless communication with the second mobile device 300A through the antenna 240. The control circuit 260 may be a processor or a central processing unit (CPU) which can execute a program for wireless communication.

The memory 255 may store data (or a program) for an operation of the first mobile device 200A. For example, the memory 255 may include a volatile memory and a non-volatile memory. For example, the volatile memory may store data to be processed or processed by the control circuit 260; however, it is not limited thereto. The volatile memory may be a random access memory (RAM), a dynamic RAM (DRAM), or a static RAM (SRAM); however, it is not limited thereto. The non-volatile memory may store a boot image or a program to be executed by the control circuit 260; however, it is not limited thereto.

The second mobile device 300A may include an antenna 301, a matching circuit 303, a rectifier circuit 305, a capacitor 307, a charge control circuit 309, a communication circuit 340, a control circuit 350, a battery 370, an interface circuit 380, and a memory 385.

A semiconductor device may include the matching circuit 303, the rectifier circuit 305, the charge control circuit 309, the communication circuit 340, and the control circuit 350. According to an exemplary embodiment of the present inventive concept, the semiconductor device may further include the interface circuit 380 and the memory 385. The semiconductor device may include an integrated circuit (IC), a system on chip (SoC), a semiconductor package, or a module; however, it is not limited thereto.

The antenna 301 may generate an electromotive force, e.g., an alternating current (AC) signal, using an alternating magnetic field generated by the antenna 240 of the first mobile device 200A. For example, the antenna 301 may be a coil antenna; however, it is not limited thereto.

The matching circuit 303 may be connected to the antenna 301 in parallel to form a resonance circuit. For example, the matching circuit 303 may include a capacitor.

The rectifier circuit 305 may be enabled or disabled in response to a rectifier control signal RCTRL output from the control circuit 350. For example, when the rectifier circuit 305 is enabled, the rectifier circuit 305 may rectify an AC signal acquired by the antenna 301 to a direct current (DC) signal (VIN).

The capacitor 307 may perform a charging operation based on an output voltage VIN of the rectifier circuit 305. For example, the capacitor 307 may store charges corresponding to the output voltage VIN of the rectifier circuit 305.

The charge control circuit 309 may charge the battery 370 based on the output voltage VIN of the rectifier circuit 305. For example, the charge control circuit 309 may charge the battery 370 using a voltage related to the output voltage VIN of the rectifier circuit 305, e.g., a voltage (or charges) charged in the capacitor 307. The charge control circuit 309 may use an energy stored in the capacitor 307 or draw the energy therefrom to make an output current larger than an input current.

An input terminal of the charge control circuit 309 is directly connected to an output terminal of the rectifier circuit 305. Accordingly, the second mobile device 300A does not include an additional voltage regulator, e.g., a DC-DC converter, a step-down converter, a buck converter, a low-dropout (LDO) regulator, to decrease the output voltage VIN of the rectifier circuit 305.

Accordingly, the charge control circuit 309 of the second mobile device 300A does not include the voltage regulator, such that an area (or a layout size) of the charge control circuit 309 can be decreased.

Figure 8:
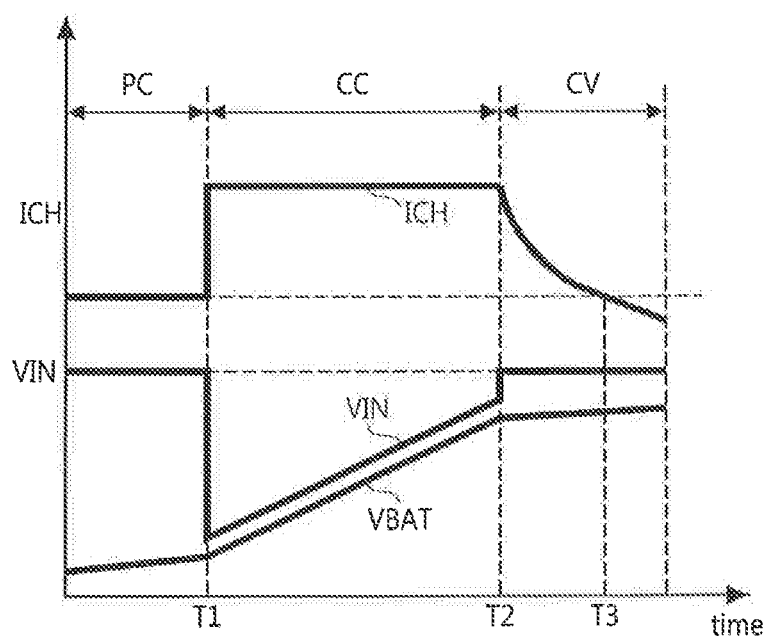
FIG. 8 is a graph which shows a variation in an input voltage and an output current of the charge control circuit shown in FIG. 2, 3, 5, or 6, according to an exemplary embodiment of the present inventive concept.

The charge control circuit 309 may control an input voltage VIN so that the input voltage VIN input into an input terminal of the charge control circuit 309 tracks an output voltage VBAT, e.g., a charging voltage, supplied to the battery 370. As shown in FIG. 8, the charge control circuit 309 may control a level of the input voltage VIN so that the level of the input voltage VIN input to the charge control circuit 309 tracks or follows a level of the output voltage VBAT using a self-tracking technology. For example, the charge control circuit 309 may perform a function of a linear charger.

In other words, the charge control circuit 309 may cause the input voltage VIN to track the charging voltage VBAT using the self-tracking technology, such that the charge control circuit 309 can charge the battery 370 at a high charging efficiency without using a voltage regulator.

A wireless signal output from the first mobile device 200A may be transmitted to the communication circuit 340 through the antenna 301 and the matching circuit 303. The communication circuit 340 may perform wireless communication with the first mobile device 200A through the antenna 301. The control circuit 350 may be a processor or a CPU which can execute a program for wireless communication. The control circuit 350 may execute the second application APP2.

When a user of the second mobile device 300A selects or touches the third GUI 120 or the fourth GUI 122 displayed on a display by the second application APP2, the interface circuit 380 may transmit a user input 381 related to a selection of the third GUI 120 or the fourth GUI 122 to the control circuit 350.

For example, when a user of the second mobile device 300A selects the third GUI 120, the interface circuit 380 may transmit a user input 381 related to a selection of the third GUI 120 to the control circuit 350. The control circuit 350 may control the rectifier circuit 305 and the communication circuit 340 to control wireless charging. Accordingly, the rectifier circuit 305 may be enabled in response to a rectifier control signal RCTRL, and the communication circuit 340 may be disabled according to a control of the control circuit 350. Accordingly, the rectifier circuit 305 may rectify an AC signal acquired by the antenna 301 to a DC signal VIN.

When the battery 370 is completely charged, the control circuit 350 may automatically change an operation mode from a wireless charging mode for performing wireless charging to a wireless communication mode for performing wireless communication. That the battery 370 is completely charged may be determined according to the charging voltage VBAT.

When a user of the second mobile device 300A selects the fourth GUI 122, the interface circuit 380 may transmit a user input 381 related to a selection of the fourth GUI 122 to the control circuit 350. The control circuit 350 may control the rectifier circuit 305 and the communication circuit 340 to control wireless communication. Accordingly, the rectifier circuit 305 may be disabled in response to a rectifier control signal RCTRL, and the communication circuit 340 may be enabled according to a control of the control circuit 350. Accordingly, the communication circuit 340 may perform wireless communication with the first mobile device 200A through the antenna 301.

According to an exemplary embodiment of the inventive concept, if a user of the second mobile device 300A selects the third GUI 120 or the fourth GUI 122, the wireless charging and the wireless communication can be performed at the same time or in parallel. The control circuit 350 may maintain each of the rectifier circuit 305 and the communication circuit 340 in an enabled state to perform the wireless communication and the wireless charging at the same time or in parallel.

The memory 385 may store data (or a program) for an operation of the second mobile device 300A. For example, the memory 385 may include a volatile memory and a non-volatile memory. For example, the volatile memory may store data to be processed or processed by the control circuit 350; however, it is not limited thereto. The volatile memory may be a RAM, a DRAM, or a SRAM; however, it is not limited thereto. The non-volatile memory may store a boot image or a program to be executed by the control circuit 350; however, it is not limited thereto.

Figure 3:
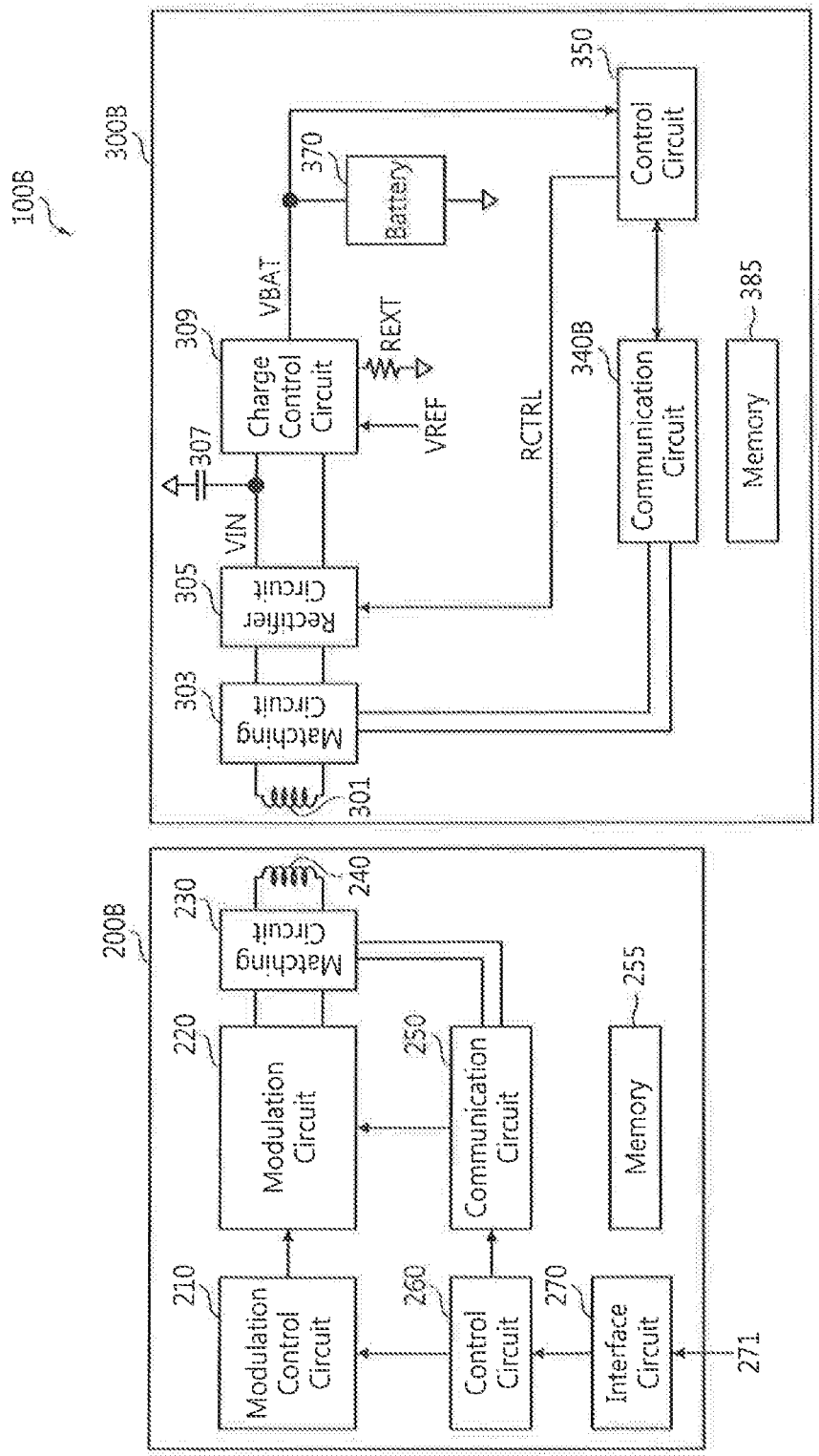
FIG. 3 shows a block diagram of the first mobile device and a block diagram of the second mobile device shown in FIG. 1, according to an exemplary embodiment of the present inventive concept.

FIG. 3 shows a block diagram of the first mobile device and a block diagram of the second mobile device shown in FIG. 1, according to an exemplary embodiment of the present inventive concept.

Referring to FIGS. 1 and 3, a wireless charging system 100B may include a first mobile device 200B and a second mobile device 300B. In FIG. 3, it is assumed that only the first application APP1 is installed in the first mobile device 200B. Accordingly, whether or not to perform wireless charging on the second mobile device 300B may be determined by a user of the first mobile device 200B.

The first mobile device 200B may include the modulation control circuit 210, the modulation circuit 220, the matching circuit 230, the antenna 240, the communication circuit 250, the memory 255, the control circuit 260, and an interface circuit 270. The control circuit 260 may execute the first application APP1 according to a user input 271 input through the interface circuit 270. For example, the interface circuit 270 may be a touch screen or a touch screen controller; however, it is not limited thereto.

When a user of the first mobile device 200B selects or touches the first GUI 110 or the second GUI 112 displayed on a display by the first application APP1, the interface circuit 270 may transmit a user input 271 related to a selection of the first GUI 110 or the second GUI 112 to the control circuit 260.

For example, when a user of the first mobile device 200B selects the first GUI 110, the interface circuit 270 may transmit a user input 271 related to a selection of the first GUI 110 to the control circuit 260. The control circuit 260 may control the modulation control circuit 210 and the communication circuit 250 to control wireless charging. When the modulation control circuit 210 controls the modulation circuit 220 for wireless charging, the modulation circuit 220 may transmit a wireless signal (for example, an unmodulated wireless signal) for wireless charging to the second mobile device 300B through the antenna 240; however, the wireless signal is not limited thereto. According to an exemplary embodiment of the present inventive concept, a type or a format of the wireless signal for wireless charging may be variously changed.

When a user of the first mobile device 200B selects the second GUI 112, the interface circuit 270 may transmit a user input 271 related to a selection of the second GUI 112 to the control circuit 260. The control circuit 260 may control the modulation control circuit 210 and the communication circuit 250 to control wireless communication. When the modulation control circuit 210 controls the modulation circuit 220 for wireless communication, the modulation circuit 220 may modulate a carrier wave based on data to be transmitted to the second mobile device 300B.

Except for an operation related to an operation of the interface circuit 270, each of the components 210, 220, 230, 240, 250, 255, and 260 of FIG. 3 is the same as or similar to each of the components 210, 220, 230, 240, 250, 255, and 260 of FIG. 2 in operation and function.

The second mobile device 300B may include the antenna 301, the matching circuit 303, the rectifier circuit 305, the capacitor 307, the charge control circuit 309, a communication circuit 340B, the control circuit 350, the battery 370, and the memory 385. A semiconductor device may include the matching circuit 303, the rectifier circuit 305, the charge control circuit 309, the communication circuit 340B, and the control circuit 350. According to an exemplary embodiment of the present inventive concept, the semiconductor device may further include the memory 385. The semiconductor device may include an IC, a SoC, a semiconductor package, or a module; however, it is not limited thereto.

The communication circuit 340B may receive and interpret an AC signal acquired by the antenna 301, determine whether the AC signal is an AC signal for wireless charging or an AC signal for wireless communication, and transmit a mode selection signal corresponding to a result of the determination to the control circuit 350.

For example, when a user of the first mobile device 200B selects the first GUI 110, the communication circuit 340B may generate a mode selection signal for controlling the rectifier circuit 305 and the communication circuit 340B in response to an AC signal for wireless charging. Accordingly, the control circuit 350 may generate a rectifier control signal RCTRL in response to the mode selection signal. The rectifier circuit 305 may be enabled in response to the rectifier control signal RCTRL, and the communication circuit 340B may be disabled according to a control of the control circuit 350. Accordingly, the rectifier circuit 305 may rectify an AC signal acquired by the antenna 301 to a DC signal VIN.

When the battery 370 is fully charged, the control circuit 350 may automatically change an operation mode from a wireless charging mode for performing wireless charging to a wireless communication mode for performing wireless communication. That the battery 370 is fully charged may be determined according to a charging voltage VBAT.

When a user of the first mobile device 200B selects the second GUI 112, the communication circuit 340B may generate a mode selection signal for controlling the rectifier circuit 305 and the communication circuit 340B in response to an AC signal for wireless communication. Accordingly, the control circuit 350 may generate a rectifier control signal RCTRL in response to the mode selection signal. The rectifier circuit 305 may be disabled in response to the rectifier control signal RCTRL, and the communication circuit 340B may be maintained in an enabled state according to a control of the control circuit 350. The communication circuit 340B may perform wireless communication with the first mobile device 200B through the antenna 301.

According to an exemplary embodiment of the present inventive concept, if a user of the first mobile device 200B selects the first GUI 110 or the second GUI 112, the communication circuit 340B may generate a control signal in response to an AC signal output from the matching circuit 303. The control circuit 350 may cause the rectifier circuit 305 and the communication circuit 340B to be enabled in response to the control signal. Accordingly, the second mobile device 300B may perform wireless charging and wireless communication at the same time or in parallel.

Except for an operation related to an operation of the communication circuit 340B, each of the components 301, 303, 305, 307, 309, 350, 370, and 385 of FIG. 3 is the same as or similar to each of the components 301, 303, 305, 307, 309, 350, 370, and 385 of FIG. 2 in function and operation.

A function of each of a reference voltage VREF and a resistance REXT shown in FIGS. 2 and 3 will be described referring to FIG. 4. For example, the reference voltage VREF may be generated by a reference voltage generator included in the second mobile device 300B. For example, the reference voltage generator may be a bandgap reference voltage generator; however, it is not limited thereto. The bandgap reference voltage generator may generate a temperature independent reference voltage. The resistance REXT may be an external resistance disposed outside the charge control circuit 309.

Figure 4:
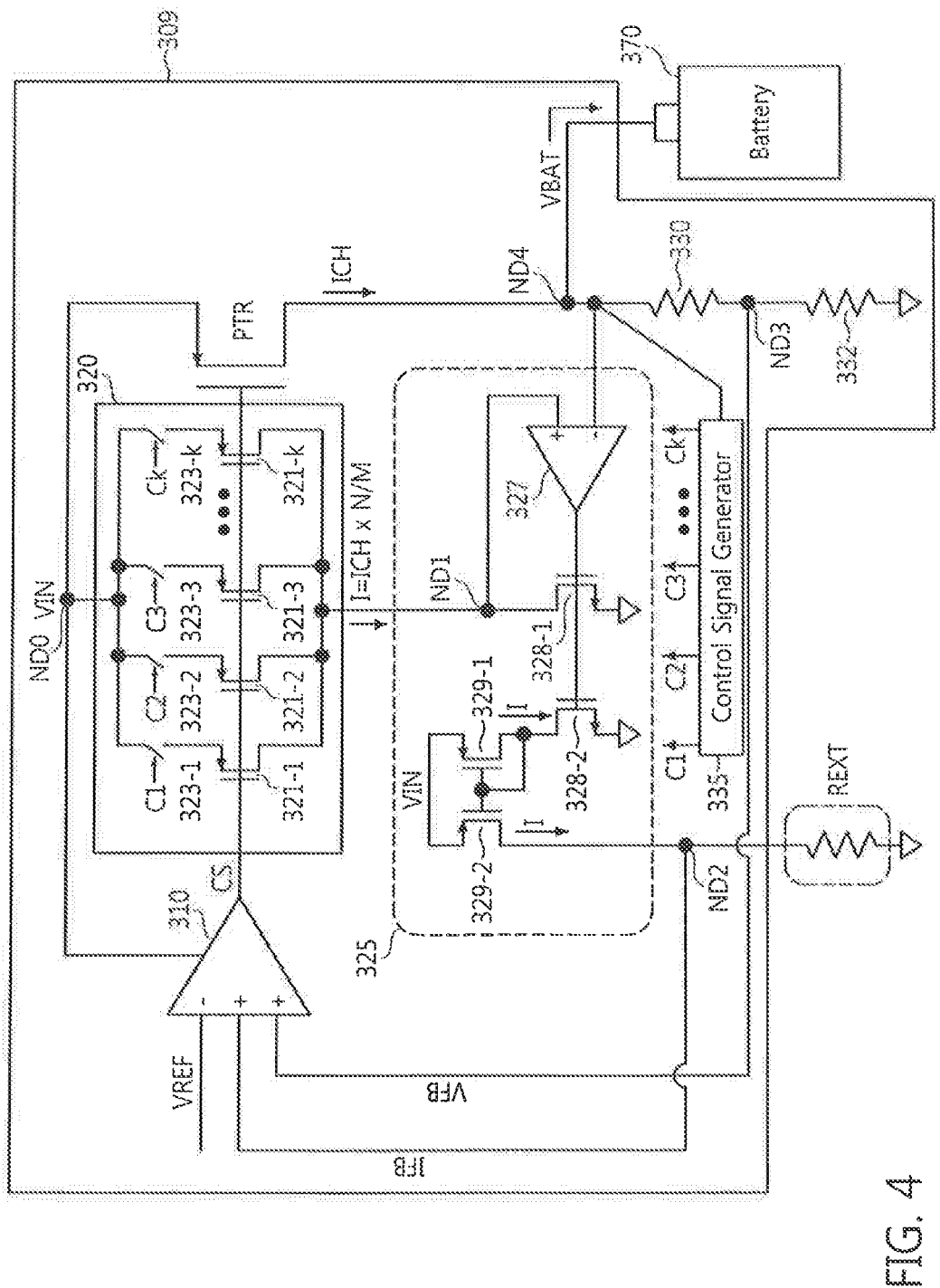
FIG. 4 shows a block diagram of a charge control circuit included in the second mobile device shown in FIG. 2 or 3, according to an exemplary embodiment of the present inventive concept.

FIG. 4 shows a block diagram of a charge control circuit included in the second mobile device shown in FIG. 2 or 3, according to an exemplary embodiment of the present inventive concept.

Referring to FIGS. 2, 3, and 4, the charge control circuit 309 may control a charging current ICH which charges the battery 370 so that the charging current ICH is higher than a current supplied from the rectifier circuit 305 or the capacitor 307 to lower a level of an input voltage VIN to a level of an output voltage VBAT. In this case, an output transistor PTR, e.g., a power transistor, is fully turned on by an internal feedback of the charge control circuit 309, such that an input terminal ND0 of the charge control circuit 309 which receives the input voltage VIN and an output terminal ND4 which outputs the output voltage VBAT can be short.

When the output voltage VBAT of the output terminal ND4 is low, the input voltage VIN of the input terminal ND0 is automatically lowered. If the output transistor PTR is fully turned on, the input voltage VIN of the input terminal ND0 is not lower than the output voltage VBAT of the output terminal ND4 due to a turn-on resistance of the output transistor PTR. Therefore, as shown in FIG. 8, a level of the input voltage VIN is changed in accordance with a level of the output voltage VBAT. In other words, the level of the input voltage VIN may track the level of the output voltage VBAT.

FIG. 8 is a graph which shows a variation in an input voltage and an output current of the charge control circuit shown in FIG. 2, or 3, according to an exemplary embodiment of the present inventive concept.

Referring to FIGS. 4 and 8, a PC mode represents a pre-charge mode, a CC mode represents a constant current mode, and a CV mode represents a constant voltage mode. Although three modes PC, CC and CV are shown in FIG. 8, the present inventive concept is not limited thereto. For example, a mode of the charge control circuit 309 may be two, or four or more.

The output transistor PTR is fully turned on in response to an output signal CS of a three-input amplifier 310, e.g., a switch control signal CS, and the charge current control circuit 320 may control the charging current ICH in response to control signals C1 to Ck. A control signal generator 335 may sense a voltage level of the charging voltage VBAT of the battery 370 connected to the output terminal ND4, and output the control signals C1 to Ck having a code value according to a result of the sensing.

In this case, each of the control signals C1 to Ck includes one or more bits, and a code value may be determined according to a bit value of each of the plurality of bits. For example, a bit value may include 1 (high level or logic 1) or 0 (low level or logic 0).

For example, when the charging voltage VBAT of the battery 370 connected to the output terminal ND4 is lower than a first voltage level (e.g., 2.8V) in the PC mode, the charge current control circuit 320 may control the charging current ICH so that the charging current ICH has a first current level (e.g., 20 mA) in response to control signals C1 to Ck having a first code value. As the charging current ICH having the first current level is supplied to the battery 370 through the output terminal ND4, the charging voltage VBAT may be charged at a second voltage level (e.g., 3.0V) higher than the first voltage level.

At a first time T1, the control signal generator 335 may sense a voltage level of the charging voltage VBAT of the battery 370 connected to the output terminal ND4 is the second voltage level (e.g., 3.0V), and output control signals C1 to Ck having a second code value according to a result of the sensing. In other words, the CC mode may be performed from the first time T1. In the CC mode, the charge current control circuit 320 may control the charging current ICH so that the charging current ICH has the second current level (e.g., 200 mA) in response to the control signals C1 to Ck having the second code value. As the charging current ICH having the second current level is supplied to the battery 370 through the output terminal ND4, the charging voltage VBAT may be charged at a third voltage level (e.g., 4.2V) higher than the second voltage level.

At a second time T2, the control signal generator 335 may sense that a voltage level of the charging voltage VBAT of the battery 370 connected to the output terminal ND4 is a third voltage level (e.g., 4.2V), and output control signals C1 to Ck having a third code value according to a result of the sensing.

In other words, the CV mode may be performed from the second time T2. In the CV mode, a charge current control circuit 320 may decrease the charging current ICH in response to the control signals C1 to Ck having the third code value. As shown in FIG. 8, the charging current ICH supplied to the battery 370 may gradually decrease in response to the control signals C1 to Ck having the third code value. It is to be understood that the third code value varies over time.

At a third time T3, e.g., at a time when a current level of the charging current ICH is equal to the first current level (e.g., 20 mA), the control circuit 350 may output the rectifier control signal RCTRL to the rectifier circuit 305. Accordingly, after the third time T3, the enabled rectifier circuit 305 may be disabled, and the disabled communication circuit 340 may be enabled according to a control of the control circuit 350. For example, an operation mode of the second mobile device 300A or 300B may be automatically converted from a wireless charging mode to a wireless communication mode.

Referring to FIG. 4 again, the charge control circuit 309 may include a three-input amplifier 310, the charge current control circuit 320, the output transistor PTR, a sensing circuit 325, a plurality of resistances 330 and 332, and the control signal generator 335. A loop circuit may control the charging voltage VBAT and the charging current ICH at the same time, and the loop circuit may include the three-input amplifier 310, the charge current control circuit 320, the sensing circuit 325, and the control signal generator 335.

The three-input amplifier 310 may be a three-input voltage amplifier; however, it is not limited thereto. The three-input amplifier 310 may generate an output signal CS, e.g., a switch control signal CS, using input signals VREF, IFB, and VFB.

Figure 9:
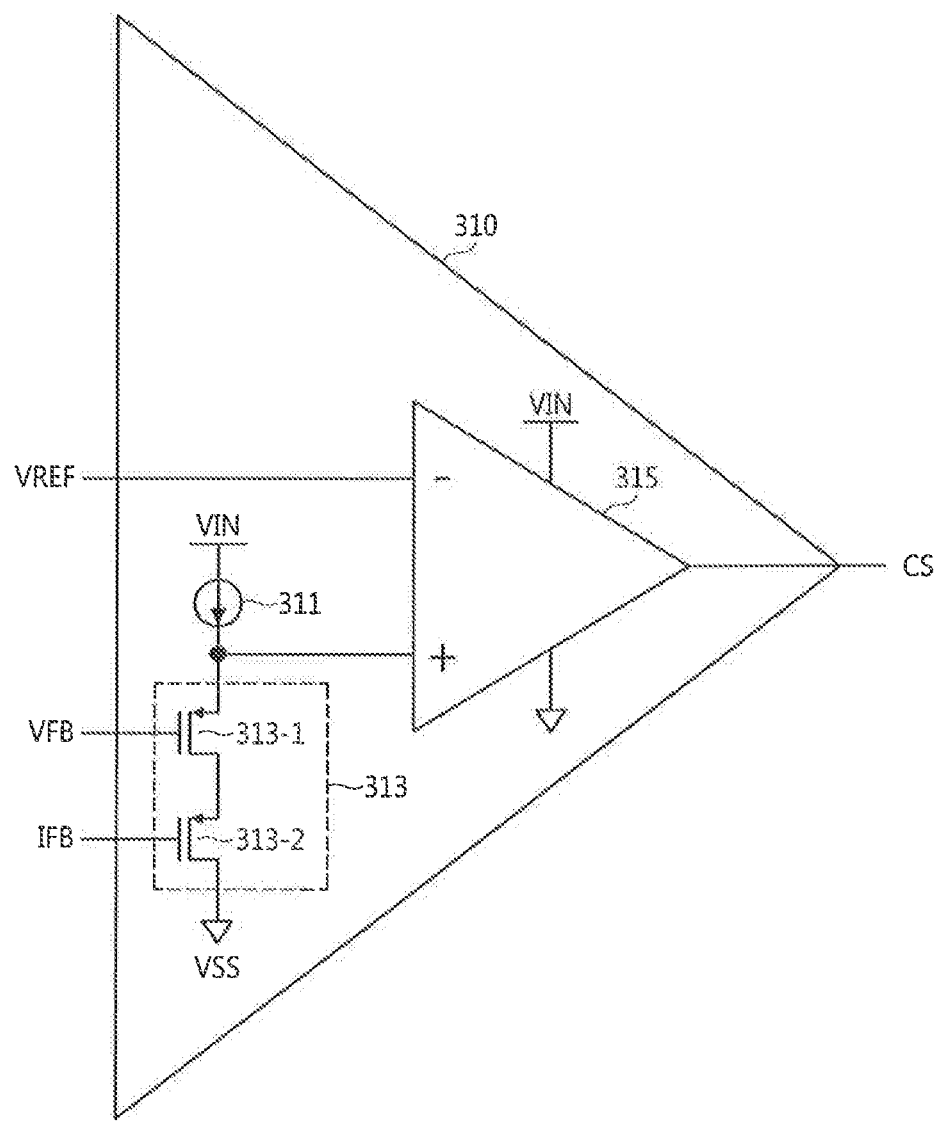
FIG. 9 is a block diagram of a three-input amplifier shown in FIG. 4 or 7, according to an exemplary embodiment of the present inventive concept.
Figure 10:
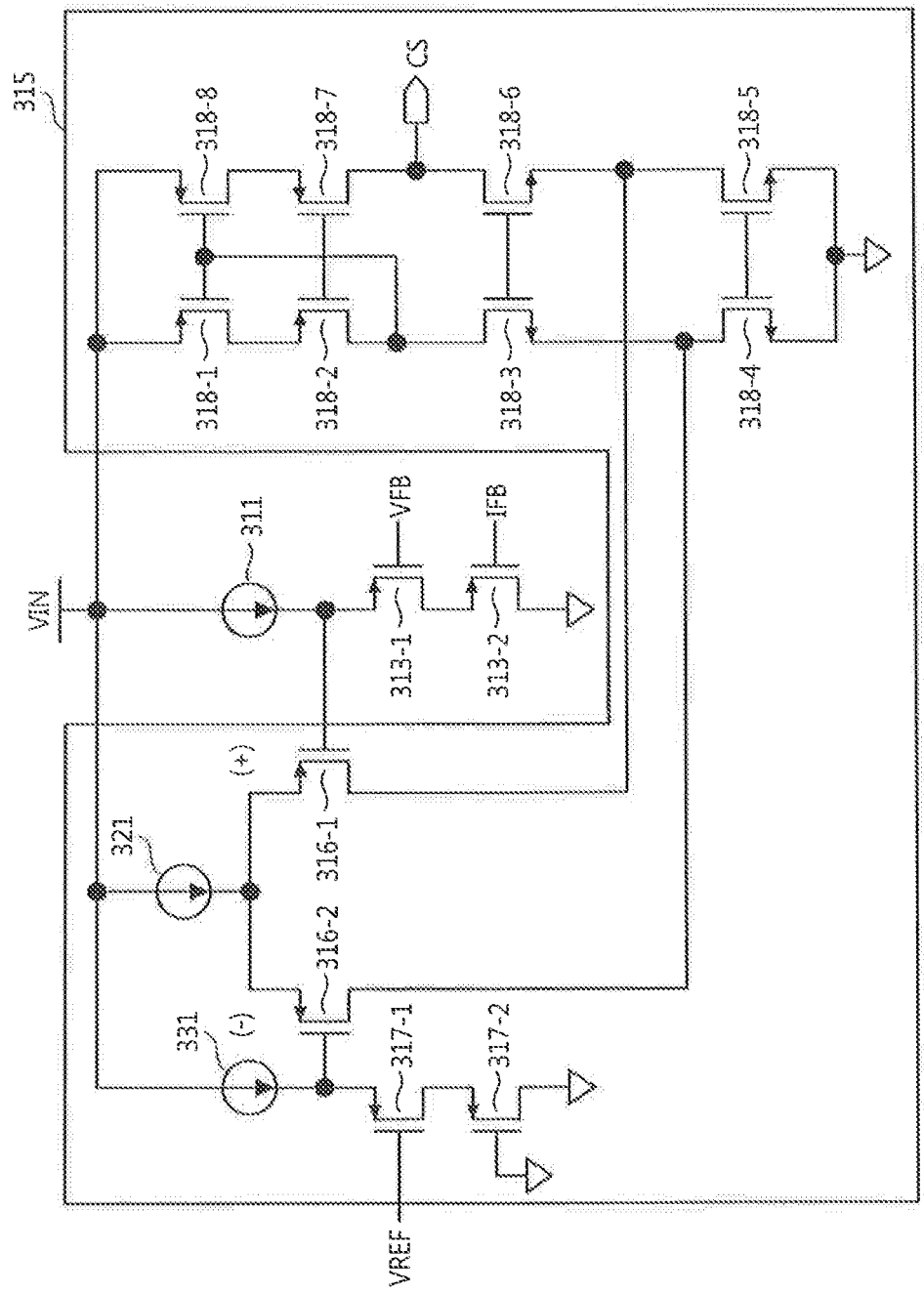
FIG. 10 is a detailed block diagram of the three-input amplifier shown in FIG. 9, according to an exemplary embodiment of the present inventive concept.

FIG. 9 is a schematic block diagram of a three-input amplifier shown in FIG. 4, and FIG. 10 is a detailed block diagram of the three-input amplifier shown in FIG. 9.

Referring to FIGS. 4, 9, and 10, the three-input amplifier 310 may include a constant current source 311, a multiplexer 313, and an amplifier 315. The constant current source 311 may be connected between the input terminal ND0 receiving the input voltage VIN and a second input terminal (e.g., a positive input terminal) of the amplifier 315, and supply a constant current (e.g., an operation current).

The multiplexer 313 may supply one of a first feedback voltage VFB and a second feedback voltage IFB to a second input terminal (+) of the amplifier 315. For example, the multiplexer 313 may be an analog switch or an analog multiplexer.

For example, when the first feedback voltage VFB is higher than the second feedback IFB or is dominant, the multiplexer 313 may supply the first feedback voltage VFB to the second input terminal (+) of the amplifier 315. When the second feedback IFB is higher than the first feedback voltage VFB or is dominant, the multiplexer 313 may supply the second feedback IFB to the second input terminal (+) of the amplifier 315.

The amplifier 315 may amplify a voltage difference between a reference voltage VREF supplied to its first input terminal (e.g., a negative input terminal) and a feedback voltage VFB or IFB supplied to its second input terminal (+), and output a switch control signal CS corresponding to a result of the amplification.

FIG. 10 shows the amplifier 315 in more detail. For example, the amplifier includes two transistors 317-1 and 317-2 connected to the first input terminal (−), two transistors 316-1 and 316-2 connected between the first and second input terminals (−,+), and two current sources 321 and 331. The amplifier 315 further includes a plurality of transistors 318-1 to 318-8 connected between the input terminals and its output terminal.

The charge current control circuit 320 may control the charging current ICH output to the output terminal ND4 through the output transistor PTR in response to the switch control signal CS and control signals C1 to Ck having a code value.

The charge current control circuit 320 may include transistors 321-1 to 321-k, where k is a natural number of four or more, and switches 323-1 to 323-k. Whether each of the transistors 321-1 to 321-k is turned on or off may be controlled by the switch control signal CS, and whether each of switches 323-1 to 323-k is turned on or off may be controlled by each of the control signals C1 to Ck. When all of the transistors 321-1 to 321-k are turned on, a size of the charge current control circuit 320 may be determined by the number of switches which are turned on among the switches 323-1 to 323-k. For example, each of the switches 323-1 to 323-k may be a metal-oxide-semiconductor field-effect transistor (MOSFET).

For example, the size of the charge current control circuit 320 may be determined according to a channel width-to-length (W/L) ratio of at least one turned on switch (or at least one transistor serially connected to at least one turned on switch). For example, an output current, e.g., a sensing current I, of the charge current control circuit 320 in FIG. 4 may be expressed as in Equation 1.

$$I = ICH*N/M$$ [Equation 1]

Here, "N" represents the size of the charge current control circuit 320, and "M" represents a size of an output transistor, e.g., a W/L ratio, "N" may be a value varying with the number of switches which are turned on, and "M" may be a fixed value.

For example, a size of the charging current control circuit 320 when the number of switches turned on is one is smaller than a size of the charging current control circuit 320 when the number of switches turned on is two or more. For example, respective sizes, e.g., the W/L ratios, of the transistors 321-1 to 321-k may be the same as or different from each other. Moreover, sizes of each of the transistors 321-1 to 321-k may be weighted values. The number of switches turned on in the PC mode may be more than the number of switches turned on in the CC mode. A charging current ICH when a value of N is small may be larger than a charging current ICH when the value of N is large.

The output transistor PTR may be turned on or off in response to a switch control signal CS output from the three-input amplifier 310. A size, e.g., the W/L ratio, of the output transistor PTR may be much larger than respective sizes of the transistors 321-1 to 321-k or respective sizes of MOSFET switches 323-1 to 323-k.

The sensing circuit 325 may sense the sensing current I and the charging voltage VBAT at the same time. The sensing circuit 325 may include a comparator 327, a plurality of transistors 328-1 and 328-2, and a current mirror (329-1 and 329-2). For example, each of the transistors 328-1 and 328-2 may be an N-type MOSFET.

The comparator 327 may include a positive input terminal (+) receiving a voltage of a connection node ND1, a negative input terminal (−) receiving an output voltage VBAT of an output node ND4, and an output terminal connected to a control terminal (e.g., a gate terminal) of each of the transistors 328-1 and 328-2. The comparator 327 may be an amplifier. The amplifier 327 may amplify a difference between a voltage of the connection node ND1 and an output voltage VBAT of the output node ND4, and output an amplified signal to a control terminal (e.g., a gate terminal) of each of the transistors 328-1 and 328-2.

The comparator 327 may generate a voltage of the connection node ND1 tracking or following the output voltage VBAT. When the output voltage VBAT is increased, an output voltage of the comparator 327 is decreased and a control voltage supplied to a gate (or a gate terminal) of each of N-type MOSFETs 328-1 and 328-2 is decreased, and thereby a current flowing in each of the N-type MOSFETs 328-1 and 328-2 is decreased. Accordingly, a voltage of the connection node ND1 may be increased.

When the output voltage VBAT is decreased, the output voltage of the comparator 327 is increased and the control voltage supplied to a gate of each of the N-type MOSFETs 328-1 and 328-2 is increased, and thereby the current flowing in each of the N-type MOSFETs 328-1 and 328-2 is increased. Accordingly, the voltage of the connection node ND1 may be decreased.

Transistors 329-1 and 329-2 may form the current mirror. The current mirror may generate a mirror current I the same as the sensing current I. A resistor REXT is connected to a resistor connection terminal ND2. For example, the resistor REXT may perform a function of converting the mirror current I output from the current mirror into the second feedback voltage IFB.

The resistors 330 and 332 may form a voltage divider. A voltage of a division node ND3 may be supplied to the three-input amplifier 310 as the first feedback voltage VFB.

The control signal generator 335 may sense an output voltage VBAT of the output node ND4, e.g., a charging voltage VBAT supplied to the battery 370, and generate control signals C1 to Ck having a code value according to a result of the sensing. As described above, the control signals C1 to Ck may be used to control the charging current ICH.

Figure 5:
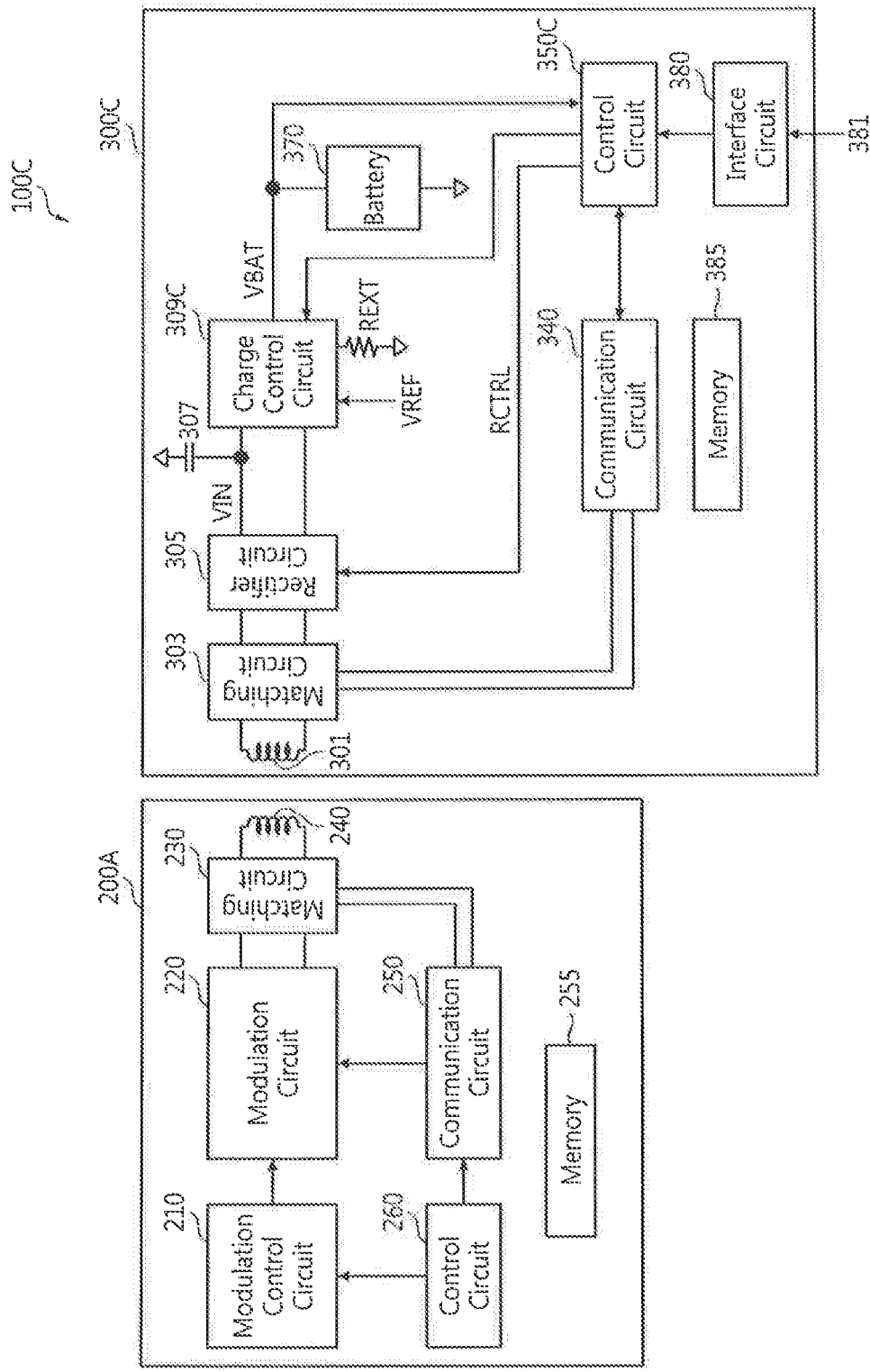
FIG. 5 shows a block diagram of the first mobile device and a block diagram of the second mobile device shown in FIG. 1, according to an exemplary embodiment of the present inventive concept.
Figure 6:
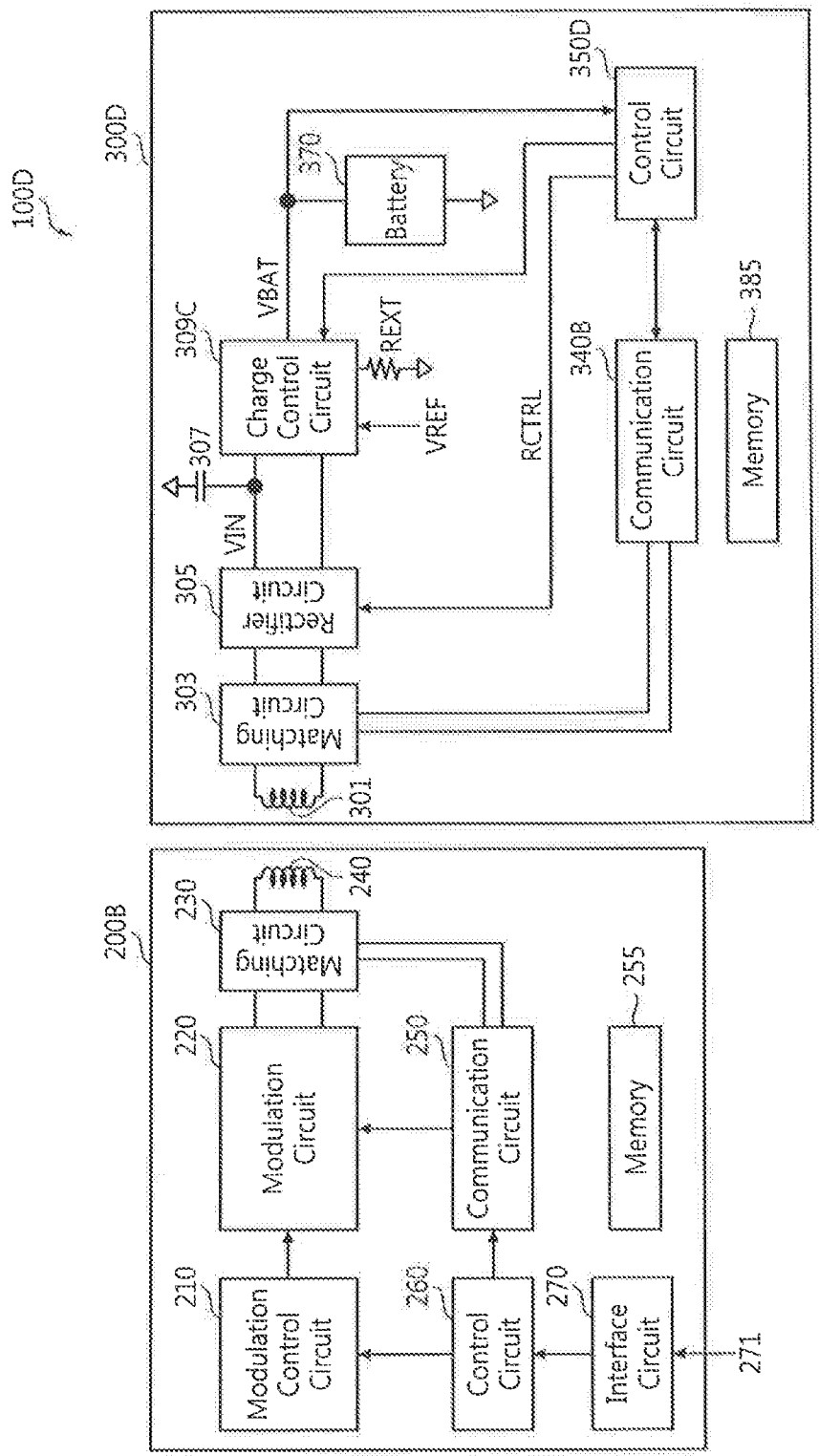
FIG. 6 shows a block diagram of the first mobile device and a block diagram of the second mobile device shown in FIG. 1, according to an exemplary embodiment of the present inventive concept.
Figure 7:
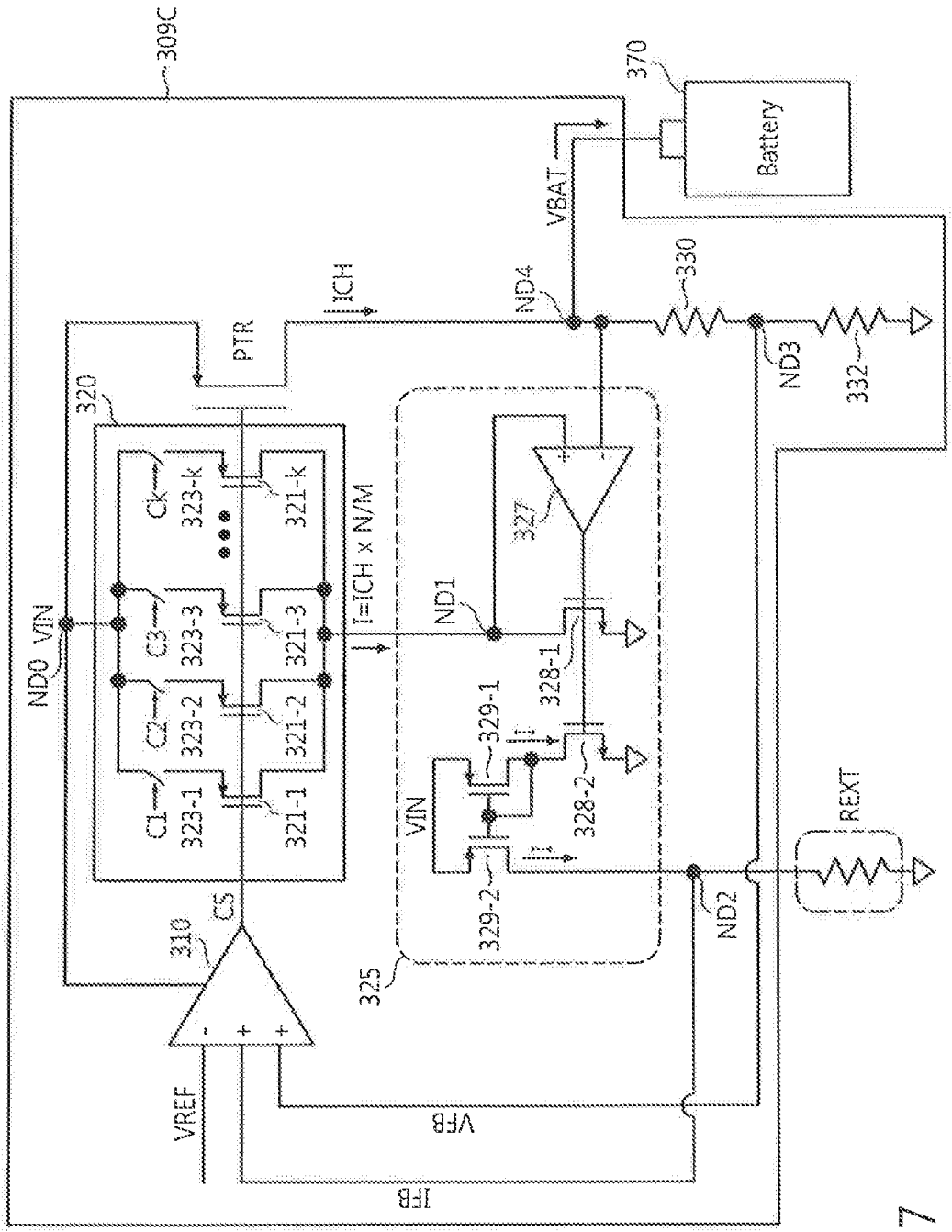
FIG. 7 shows a block diagram of a charge control circuit included in the second mobile device shown in FIG. 5 or 6, according to an exemplary embodiment of the present inventive concept.

FIG. 5 shows a block diagram of the first mobile device and a block diagram of the second mobile device shown in FIG. 1, according to an exemplary embodiment of the present inventive concept. FIG. 6 shows a block diagram of the first mobile device and a block diagram of the second mobile device shown in FIG. 1, according to an exemplary embodiment of the present inventive concept. FIG. 7 shows a block diagram of a charge control circuit included in the second mobile device shown in FIG. 5 or 6 according to an exemplary embodiment of the present inventive concept.

Except for a charge control circuit 309C and a control circuit 350C, a second mobile device 300C of FIG. 5 is the same as or similar to the second mobile device 300A of FIG. 2 in structure and function. The charge control circuit 309C of FIG. 7, unlike the charge control circuit 309 of FIG. 4, does not include the control signal generator 335.

Referring to FIGS. 5 and 7 the control circuit 350C may sense an output voltage VBAT of the output node ND4, in other words, the charging voltage VBAT supplied to the battery 370, and generate control signals C1 to Ck having a code value according to a result of the sensing. As described above, the control signals C1 to Ck may be used to control the charging current ICH. The control circuit 350C of FIG. 5 may perform a function of the control signal generator 335 of FIG. 4.

Except for a charge control circuit 309C and a control circuit 350D, a second mobile device 300D of FIG. 6 is the same as or similar to the second mobile device 300B of FIG. 3 in structure and function. Referring to FIGS. 6 and 7, the control circuit 350D may sense the output voltage VBAT of the output node ND4, e.g., the charging voltage VBAT supplied to the battery 370, and generate control signals C1 to Ck having a code value according to a result of the sensing. As described above, the control signals C1 to Ck may be used to control the charging current ICH. The control circuit 350D of FIG. 6 may perform a function of the control signal generator 335 of FIG. 4.

Figure 11:
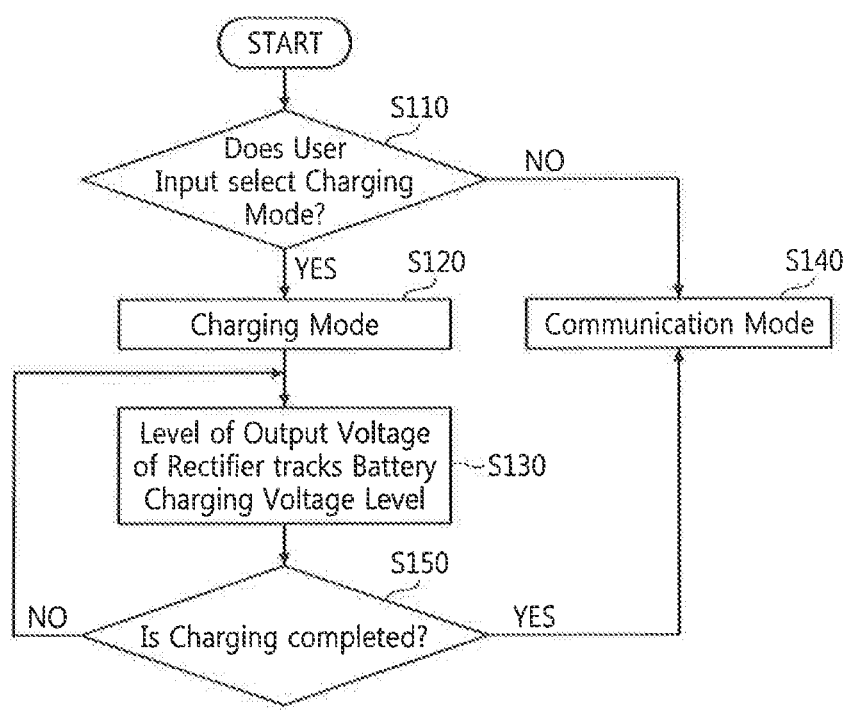
FIG. 11 is a flow chart which describes an operation of the second mobile device shown in FIG. 2 or 5, according to an exemplary embodiment of the present inventive concept.

FIG. 11 is a flow chart which describes an operation of the second mobile device shown in FIG. 2 or 5, according to an exemplary embodiment of the present inventive concept. Referring to FIGS. 1, 2, 4, and 8 to 11, when a user of the second mobile device 300A selects the third GUI 120, the user input 381 may be transmitted to the control circuit 350 through the interface circuit 380. The control circuit 350 may receive and interpret (or analyze) the user input 381 received through the interface circuit 380.

When the user input 381 selects a charging mode for wireless charging (YES of S110), the second mobile device 300A may operate in a charging mode. In other words, in the charging mode, the control circuit 350 may generate a rectifier control signal RCTRL for enabling the rectifier circuit 305, and disable the communication circuit 340 (S120).

The charge control circuit 309 may control a level of an input voltage VIN so that a level of an output voltage VIN of the rectifier circuit 305, e.g., a level of the input voltage VIN of the charge control circuit 309, tracks a level of the charging voltage VBAT of the battery 370 (S130). Moreover, the charge control circuit 309 may control the charging current ICH (S130).

The control circuit 350 may monitor whether or not charging is completed based on a level of the charging voltage VBAT, and when the charging is completed (Yes in S150), the control circuit 350 may generate a rectifier control signal RCTRL for disabling the rectifier circuit 305 and enable the communication circuit 340 (S140). When the charging is not completed (No in S150), the charge control circuit 309 may perform step S130 again.

When the user input 381 selects a communication mode for wireless communication (NO in S110), the second mobile device 300A may operate in the communication mode. In other words, in the communication mode, the control circuit 350 may generate a rectifier control signal RCTRL for disabling the rectifier circuit 305 and enable the communication circuit 340 (S140).

Figure 12:
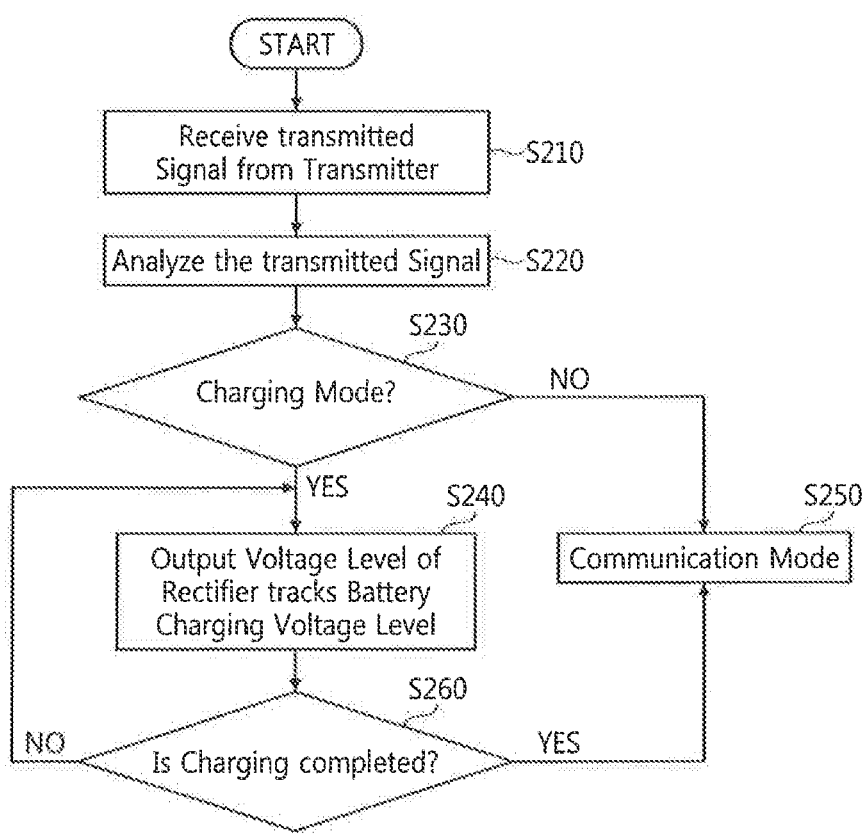
FIG. 12 is a flow chart which describes an operation of the second mobile device shown in FIG. 3 or 6, according to an exemplary embodiment of the present inventive concept.

FIG. 12 is a flow chart which describes an operation of the second mobile device shown in FIG. 3 or 6, according to an exemplary embodiment of the present inventive concept. Referring to FIGS. 1, 3, 4, 6 to 10, and 12, when a user of the first mobile device 200B selects the first GUI 110, a user input 271 is transmitted to the control circuit 260 through the interface circuit 270. The modulation circuit 220 transmits a wireless signal for wireless charging through the antenna 240.

The communication circuit 340B of the second mobile device 300B may receive a transmitted signal (e.g., AC signal) acquired by the antenna 301 (S210), interpret (or analyze) the transmitted signal (e.g., AC signal), and transmit a result of the interpretation (or analyzing) to the control circuit 350 (S220). According to an exemplary embodiment of the present inventive concept, the communication circuit 340B may directly transmit the transmitted signal (e.g., AC signal) acquired by the antenna 301 to the control circuit 350, and the control circuit 350 may determine whether the transmitted signal is a signal for wireless charging or a signal for wireless communication.

When the user input 271 selects a charging mode for wireless charging (Yes in S230), the second mobile device 300B may operate in the charging mode. In other words, in the charging mode, the control circuit 350 may generate a rectifier control signal RCTRL for enabling the rectifier circuit 305, and disable the communication circuit 340B (S240). The charge control circuit 309 may control a level of an input voltage VIN so that a level of an output voltage VIN of the rectifier circuit 305, a level of an input voltage VIN of the charge control circuit 309, tracks a level of the charging voltage VBAT of the battery 370 (S240). Moreover, the charge control circuit 309 may control the charging current ICH (S240).

The control circuit 350 may monitor whether or not charging is completed based on a level of the charging voltage VBAT, and when the charging is completed (Yes in S260), the control circuit 350 may generate a rectifier control signal RCTRL for disabling the rectifier circuit 305 and enable the communication circuit 340B (S250). When the charging is not completed (NO in S260), the charge control circuit 309 may perform step S240 again.

When the user input 271 selects a communication mode for wireless communication (NO in S230), the second mobile device 300B may operate in the communication mode. In other words, in the communication mode, the control circuit 350 may generate a rectifier control signal RCTRL for disabling the rectifier circuit 305 and enable the communication circuit 340B (S250).

Figure 13:
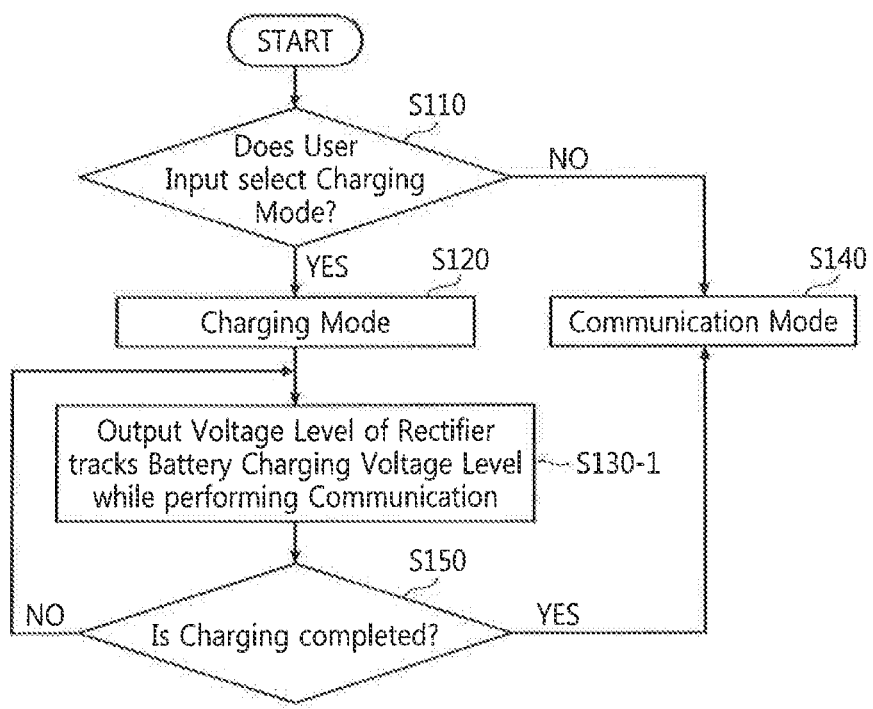
FIG. 13 is a flow chart which describes an operation of the second mobile device shown in FIG. 2 or 5, according to an exemplary embodiment of the present inventive concept.

FIG. 13 is a flow chart which describes an operation of the second mobile device shown in FIG. 2 or 5, according to an exemplary embodiment of the present inventive concept. Referring to FIGS. 11 and 13, except for step S130-1, steps S110, S120, S140, and S150 shown in FIG. 13 are the same as or similar to the steps S110, S120, S140, and S150 shown in FIG. 11.

In other words, in the charging mode (S120), the second mobile device 300A, 300B, 300C, or 300D may control a level of an input voltage VIN so that a level of an output voltage VIN of the rectifier circuit 305, e.g., a level of the input voltage VIN of the charge control circuit 309 or 309C, tracks a level of the charging voltage VBAT of the battery 370 while communicating with the first mobile device 200A or 200B (S130-1). Moreover, the charge control circuit 309 or 309C may control the charging current ICH (S130-1).

Although it is shown that step S130-1 is performed in the charging mode in FIG. 13, the present inventive concept is not limited thereto. For example, the second mobile device 300A, 300B, 300C, or 300D may perform a charging operation and a communication operation in the communication mode (S140) at the same time or in parallel.

Figure 14:
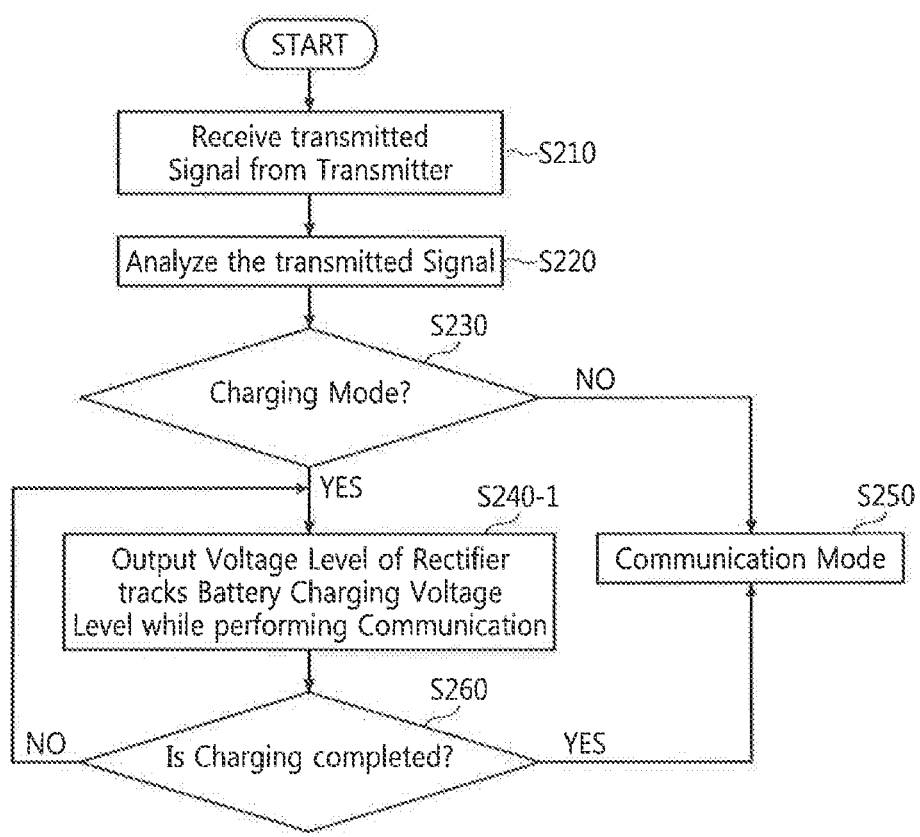
FIG. 14 is a flow chart which describes an operation of the second mobile device shown in FIG. 3 or 6, according to an exemplary embodiment of the present inventive concept.

FIG. 14 is a flow chart which describes an operation of the mobile device shown in FIG. 3 or 6, according to an exemplary embodiment of the present inventive concept. Referring to FIGS. 12 and 14, except for step S240-1, steps S210, S220, S250, and S260 shown in FIG. 14 are the same as or similar to the steps S210, S220, S250, and S260 shown in FIG. 12.

In other words, in the charging mode (S230), the second mobile device 300A, 300B, 300C, or 300D may control a level of an input voltage VIN so that a level of an output voltage VIN of the rectifier circuit 305, e.g., a level of an input voltage VIN of the charge control circuit 309 or 309C, tracks a level of a charging voltage VBAT of the battery 370 while communicating with the first mobile device 200A or 200B (S240-1). Moreover, the charge control circuit 309 or 309C may control the charging current ICH (S240-1).

Although it is shown that step S240-1 is performed in the charging mode in FIG. 14, the present inventive concept is not limited thereto. For example, the second mobile device 300A, 300B, 300C, or 300D may perform a charging operation and a communication operation in the communication mode (S250) at the same time or in parallel.

Figure 15:
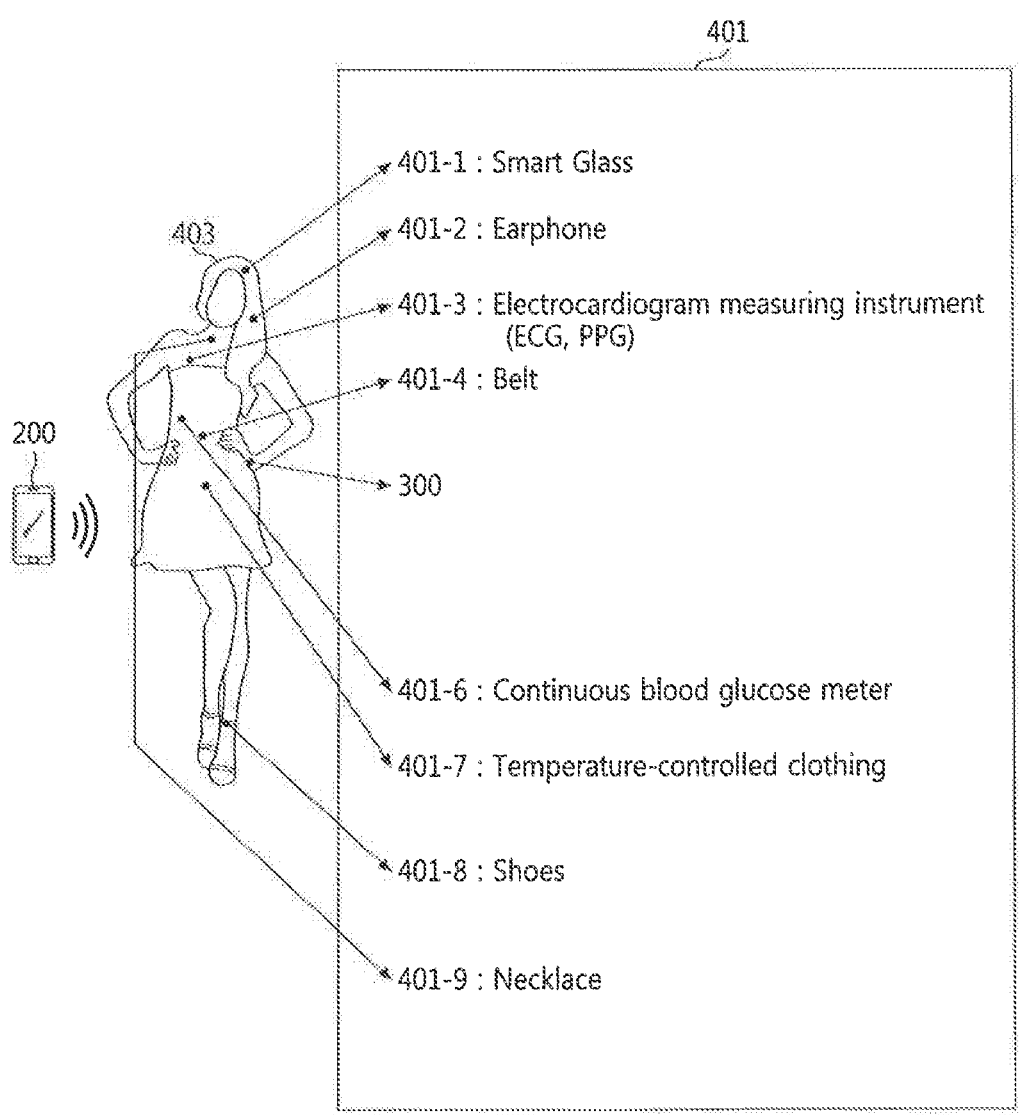
FIG. 15 shows a block diagram of a wireless charging system having mobile devices that can be charged using a wireless signal output from the first mobile device of FIG. 1, according to an exemplary embodiment of the present inventive concept.

FIG. 15 shows a block diagram of a wireless charging system including mobile devices that can be charged using a wireless signal output from the first mobile device of FIG. 1, according to an exemplary embodiment of the present inventive concept. Referring to FIGS. 1 to 15, a wireless charging system may include mobile devices 401 which includes the first mobile device (200A or 200B, collectively 200) and the second mobile device (300A, 300B, 300C, or 300D, collectively 300).

For example, the wireless charging system may be an IoT network system, and the mobile devices 401 may be wearable IoT devices.

The wearable IoT devices 401 may include a smart glass 401-1, an ear phone 401-2, an electrocardiogram measuring instrument (electrocardiogram (ECG)/photoplethysmography (PPG) measuring instrument 401-3, a belt 401-4, the second mobile device 300 such as a band or a watch, a blood glucose meter 401-6, temperature-controlled clothing 401-7, shoes 401-8, and a necklace 401-9.

Each of the wearable IoT devices 401 may include a sensor which senses a health status of a user 403, a surrounding environment, and/or a user command. Each of the wearable IoT devices 401 may include components 301, 303, 305, 307, 309, 340, 350, and 385 described referring to FIGS. 1 to 14, and may further include component 380. According to an exemplary embodiment of the present inventive concept, component 309 or 340 may be replaced with component 309C or 340B.

For example, each of the wearable IoT devices 401 may be the same as or similar to the mobile devices 300A, 300B, 300C, or 300D described referring to FIG. 2, 3, 5, or 6 in structure and function. For example, the first mobile device 200 which can perform a function of a master device or a hub may transmit or receive data to or from each of the wearable IoT devices 401 through a wireless communication protocol.

The first mobile device 200 may transmit electro-stimulation information which can treat an abnormal brain wave of the user 403 based on brain wave information on the user 403 to the smart glass 401-1.

The earphone 401-2 includes a temperature sensor, an image sensor, and/or a touch sensor, and may sense physical information about the user 403 using at least one of these sensors and transmit the sensed information to the first mobile device 200.

The ECG 401-3 or PPG 401-3 may measure an electrocardiogram of the user 403, and transmit a result of the measurement to the first mobile device 200.

The belt 401-4 may include a sensor which can measure waist circumference, respiratory function, and/or obesity of the user 403, and include a vibration function or an electrical stimulation function for a treatment of obesity or pain. The second mobile device 300 may include a sensor which can measure temperature, pressure, and/or ultraviolet light. A continuous blood glucose meter (e.g., blood glucose level tester 401-6) may include a blood glucose sensor for measuring blood sugar of the user 403. The blood glucose measurement sensor may be a non-invasive sensor. A measured blood glucose level may be transmitted to a service provider via the first mobile device 200.

The temperature-controlled clothing 401-7 may include a sensor which can measure a temperature or an ambient temperature of the user 403. The temperature-controlled clothing 401-7 may compare a temperature set in advance with a measured temperature, and control a cooling function or a heating function of the temperature-controlled clothing 401-7 according to a result of the comparison. For example, the temperature-controlled clothing 401-7 may be an infant diaper, an adult diaper, or underwear. The diaper or underwear may include a skin conductivity sensor, a temperature sensor, a test strip sensor, or a pressure sensor, sense a state of the user 403 using this sensor, and inform the user 403 of a replacement time of the diaper or underwear or perform cooling or heating on the user 403. The diaper or underwear may embed a heating coil or a cooling pipe for cooling or heating.

The shoes 401-8 may include a sensor which senses a weight of the user 403, a plantar pressure by region, air pollution, humidity, or shoe smell, or a Global Positioning System (GPS) sensor. Information collected from the sensor may be transmitted to the first mobile device 200. The first mobile device 200 may provide the user 403 with information about correcting their posture, a time to clean the shoes, or a time to replace the shoes.

The necklace 401-9 may be installed around a neck of the user 403, and include a sensor which senses breathing, pulse, temperature, momentum, consumed calories, GPS, brain wave measurement, voice, ECG, or PPG of the user 403. Information collected from the sensor may be autonomously analyzed by the necklace 401-9 or may be transmitted to the first mobile device 200. The service provider may provide the first mobile device 200 with a related service based on information (e.g., sensed information and user information) output from the first mobile device 200.

Figure 16:
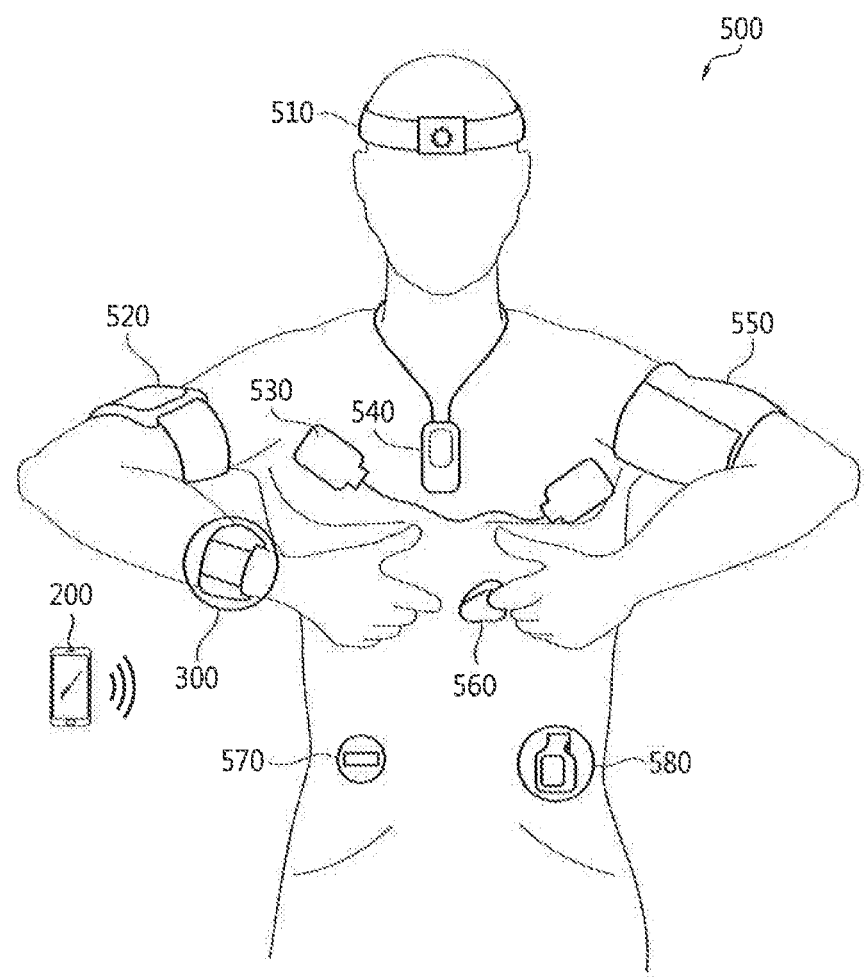
FIG. 16 shows a block diagram of a wireless charging system including mobile devices that can be charged using a wireless signal output from the first mobile device of FIG. 1, according to an exemplary embodiment of the present inventive concept.

FIG. 16 shows a block diagram which shows a wireless charging system including mobile devices that can be charged using a wireless signal output from the first mobile device of FIG. 1, according to an exemplary embodiment of the present inventive concept. Referring to FIGS. 1 to 14, and 16, a wireless charging system 500, e.g., a wireless sensor network (WSN) system, may include the first mobile device 200 and wearable IoT devices 300, 510, 520, 530, 540, 550, 560, 570, and 580. Each of the wearable IoT devices 510 to 580 may be the same as or similar to the mobile device 300 described referring to FIGS. 1 to 14 in structure and operation. As an example, a first IoT device 300 is a smart watch, a second IoT device 510 is a sleep sensor which induces sleep, a third IoT device 520 is a calories sensor, a fourth IoT device 530 is a blood glucose sensor, a fifth IoT device 540 is a fall detection sensor, a sixth IoT device 550 is a stress detection sensor, a seventh IoT device 560 is an oxygen saturation sensor (e.g., peripheral capillary oxygen saturation—SpO2), an eighth IoT device 570 is a skin temperature sensor, and a ninth IoT device 580 is a pedometer.

Each of the wearable IoT devices 300, 510, 520, 530, 540, 550, 560, 570, and 580 may perform wireless charging using a wireless signal output from the first mobile device 200.

A charging control circuit according to an exemplary embodiment of the present inventive concept can be embodied in a small area with a high charging efficiency without including a step-down switching converter. Accordingly, the size of a device including the charging control circuit can be reduced.

A device including a charging control circuit according to an exemplary embodiment of the present inventive concept may perform wireless charging on a battery included in the device using a wireless signal output from a mobile device, such that a user of the device does not have to carry an additional charging device. As an example, when the mobile device is a smart phone, the device including the charging control circuit may wirelessly charge its battery using a wireless signal output from the mobile device.

While the present inventive concept has been particularly shown and described with reference to exemplary embodiments thereof, it will be understood by those of ordinary skill in the art that various changes in form and details may be made thereto without departing from the scope of the inventive concept as defined by the following claims.

What is claimed is:

1. A device comprising:
   a rectifier circuit configured to rectify an alternating current (AC) signal into a direct current (DC) signal, and to output the DC signal as an input voltage; and
   a charge control circuit configured to output a charging voltage based on the input voltage, and to control the input voltage,
   wherein each of the input voltage and the charging voltage increases linearly at the same time with the same slope for the entirety of a constant current mode,
   wherein the input voltage is received at a first node of the charge control circuit, the first node connected to an input terminal of a power transistor, and
   wherein the charging voltage is output from an output terminal of the power transistor.

2. The device of claim 1, further comprising:
   a control circuit configured to control the rectifier circuit;
   a communication circuit configured to perform wireless communication; and
   a matching circuit configured to wirelessly receive power.

3. The device of claim 2, further comprising an interface circuit configured to transmit a user input to the control circuit that is further configured to control the communication circuit.

4. The device of claim 2, wherein the charge control circuit includes:
   a charge current control circuit configured to receive the input voltage at the first node, to output a sensing current to a second node, and to turn on the power transistor;
   a first comparator configured to compare a voltage level of the second node with a voltage level of a third node that receives a charging current from the power transistor;
   a current mirror configured to generate a mirror current corresponding to the sensing current; and
   an amplifier configured to receive a first feedback voltage based on the mirror current, and to amplify a difference between the first feedback voltage and a reference voltage to generate a switch control signal.

5. The device of claim 4, wherein, in response to the switch control signal and a plurality of control signals, the charge current control circuit is configured to decrease the sensing current and to turn on the power transistor.

6. The device of claim 4, wherein the amplifier includes a multiplexer, a first input terminal configured to receive the reference voltage, a second input terminal configured to receive the first feedback voltage, a third input terminal configured to receive a second feedback voltage, and a second comparator.

7. The device of claim 5, wherein the plurality of control signals are provided to the charge control circuit from the control circuit.

8. The device of claim 4, wherein an output of the first comparator is provided to the current mirror via a plurality of transistors.

9. The device of claim 6, wherein, when the first feedback voltage is greater than the second feedback voltage, the first feedback voltage passes through the multiplexer to an input terminal of the second comparator.

10. The device of claim 6, wherein the first feedback voltage passes through the multiplexer in the constant current mode.

11. The device of claim 5, wherein the charge control circuit further includes a control signal generator connected to the output terminal of the power transistor, and to generate the plurality of control signals based on a voltage at the output terminal of the power transistor.

12. The device of claim 1, wherein, during a charging period, an increasing ratio of the input voltage is the same as an increasing ratio of the charging voltage.

13. The device of claim 1, wherein the device is charged while wirelessly communicating with a smartphone.

14. A charge control circuit configured to supply a charging voltage to a battery, comprising:
    an input terminal configured to receive an input voltage from a rectifier circuit; and
    an output terminal connected to the battery,
    wherein the charge control circuit is configured to control the input voltage, and each of the input voltage and the charging voltage increases linearly at the same time with the same slope for the entirety of a constant current mode,
    wherein the charge control circuit further comprises a power transistor connected to the output terminal and configured to receive the input voltage and provide the charging voltage to the battery.

15. The charge control circuit of claim 14, further comprising:
    a charge current control circuit configured to receive the input voltage via a first node, to output a sensing current via a second node, and to turn on the power transistor;
    a comparator having a first input terminal connected to the power transistor and a second input terminal connected to the second node of the charge current control circuit;
    a current mirror connected to an output terminal of the comparator and configured to generate a mirror current corresponding to the sensing current; and
    an amplifier configured to receive a reference voltage, a first feedback voltage and a second feedback voltage, and configured to output a switch control signal based on a difference between the reference voltage and the first feedback voltage or a difference between the reference voltage and the second feedback voltage, wherein the sensing current is input to the second input terminal of the comparator via the second node of the charge current control circuit.

16. The charge control circuit of claim 15, wherein the charge current control circuit includes a plurality of transistors that are turned on in response to the switch control signal.

17. The charge control circuit of claim 15, wherein the charge current control circuit includes a plurality of switches.

18. The charge control circuit of claim 15, further comprising at least one transistor connected between the output terminal of the comparator and the current mirror.

19. The charge control circuit of claim 15, further comprising a control signal generator connected to the power transistor and configured to generate a plurality of control signals based on the charging voltage.

20. A device comprising:
an antenna;
a battery;
a rectifier circuit configured to rectify an alternating current (AC) signal into a direct current (DC) signal, and to output the DC signal as an input voltage;
a charge control circuit configured to output a charging voltage based on the input voltage provided to a plurality of switches, and to control the input voltage, wherein the plurality of switches are included in the charge control circuit and operate in response to a plurality of control signals;
a matching circuit connected to the antenna;
a communication circuit configured to perform wireless communication with an external device through the antenna; and
a control circuit configured to control the rectifier circuit and the communication circuit to control wireless charging,
wherein each of the input voltage and the charging voltage increases linearly at the same time with the same slope for the entirety of a constant current mode.

* * * * *